(12) United States Patent
Sato et al.

(10) Patent No.: US 9,134,696 B2
(45) Date of Patent: Sep. 15, 2015

(54) CARTRIDGE WITH FIRST AND SECOND COUPLING MEMBERS FOR ENGAGING MAIN ASSEMBLY

(75) Inventors: Masaaki Sato, Yokohama (JP); Tatsuo Fujisaki, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 12/935,751

(22) PCT Filed: May 27, 2009

(86) PCT No.: PCT/JP2009/060105
§ 371 (c)(1),
(2), (4) Date: Sep. 30, 2010

(87) PCT Pub. No.: WO2009/145351
PCT Pub. Date: Dec. 3, 2009

(65) Prior Publication Data
US 2011/0020031 A1    Jan. 27, 2011

(30) Foreign Application Priority Data
May 27, 2008  (JP) .................................. 2008-138249

(51) Int. Cl.
G03G 21/16  (2006.01)
G03G 21/18  (2006.01)
F16D 1/10  (2006.01)

(52) U.S. Cl.
CPC .............. G03G 21/186 (2013.01); F16D 1/101 (2013.01); *Y10T 29/49826* (2015.01)

(58) Field of Classification Search
CPC ..................................................... G03G 21/186
USPC ......................................... 399/111, 117, 167
See application file for complete search history.

(56) References Cited

U.S. PATENT DOCUMENTS 5,331,373 A    7/1994  Nomura et al.
5,452,056 A    9/1995  Nomura et al.

(Continued)

FOREIGN PATENT DOCUMENTS

EP    0 833 214 A2   4/1998
GB    661 490 A      11/1951

(Continued)

OTHER PUBLICATIONS

International Search Report in International Application No. PCT/JP2009/060105 issued Jul. 17, 2009.

(Continued)

*Primary Examiner* — Robert Beatty
(74) *Attorney, Agent, or Firm* — Fitzpatrick, Cella, Harper & Scinto

(57) ABSTRACT

A cartridge detachably mountable to a main assembly of an electrophotographic image forming apparatus, the main assembly including a first coupling member which is rotatable about a first axis and which has a first edge line provided at a free end portion with respect to a direction of the first axis, includes a second coupling member which is rotatable about a second axis and which has a second edge line provided at a free end portion with respect to a direction of the second axis, the second coupling member being engageable with the first coupling member to receive a driving force from the first coupling member; and a rotatable member rotatable by the driving force received by the second coupling member; wherein when the first edge line and the second edge line are contacted to each other before the first coupling member and the second coupling member are engaged with each other, upon mounting the cartridge to the main assembly of the apparatus so as to bring the second coupling member close to the first coupling member in a state in which the first axis and the second axis are substantially aligned with a common phantom line, (i) the first edge line and the second edge line projected on a first phantom plane including the phantom line are crossed with each other, and (ii) the first edge line and the second edge line projected on a second phantom plane perpendicular to the phantom line are crossed with each other, and at least one of a normal line of the first edge line and a normal at a second edge line at a crossing point does not pass through the phantom line.

10 Claims, 22 Drawing Sheets

(56) References Cited

U.S. PATENT DOCUMENTS

| | | | |
|---|---|---|---|
| 5,528,341 A | 6/1996 | Shishido et al. | |
| 5,585,889 A | 12/1996 | Shishido et al. | |
| 5,870,654 A | 2/1999 | Sato et al. | |
| 5,911,096 A | 6/1999 | Batori et al. | |
| 5,940,658 A | 8/1999 | Yokoi et al. | |
| 5,966,566 A | 10/1999 | Odagawa et al. | |
| 5,974,288 A | 10/1999 | Sato | |
| 6,035,159 A * | 3/2000 | Azuma et al. | 399/111 |
| 6,075,957 A | 6/2000 | Batori et al. | |
| 6,104,894 A | 8/2000 | Sato et al. | |
| 6,131,007 A | 10/2000 | Yamaguchi et al. | |
| 6,185,390 B1 | 2/2001 | Higeta et al. | |
| 6,188,856 B1 | 2/2001 | Sato | |
| 6,305,867 B1 | 10/2001 | Schweigert et al. | |
| 6,381,420 B1 | 4/2002 | Sato et al. | |
| 6,460,066 B1 | 10/2002 | Chen et al. | |
| 6,501,927 B1 * | 12/2002 | Watanabe et al. | 399/117 |
| 6,714,749 B2 | 3/2004 | Sato et al. | |
| 6,829,455 B2 * | 12/2004 | Yasumoto et al. | 399/167 |
| 6,892,042 B2 * | 5/2005 | Jang et al. | 399/167 |
| 6,895,199 B2 | 5/2005 | Sato et al. | |
| 6,898,399 B2 | 5/2005 | Morioka et al. | |
| 6,937,832 B2 | 8/2005 | Sato et al. | |
| 7,149,457 B2 | 12/2006 | Miyabe et al. | |
| 7,155,140 B2 | 12/2006 | Arimitsu et al. | |
| 7,155,141 B2 | 12/2006 | Sato et al. | |
| 7,158,736 B2 | 1/2007 | Sato et al. | |
| 7,200,349 B2 | 4/2007 | Sato et al. | |
| 7,218,882 B2 | 5/2007 | Toba et al. | |
| 7,224,925 B2 | 5/2007 | Sato et al. | |
| 7,236,722 B2 * | 6/2007 | Portig | 399/167 |
| 7,283,766 B2 | 10/2007 | Arimitsu et al. | |
| 7,349,657 B2 | 3/2008 | Sato et al. | |
| 7,412,193 B2 | 8/2008 | Sato et al. | |
| 7,424,247 B2 * | 9/2008 | Iwasaki | 399/117 |
| 7,433,631 B2 * | 10/2008 | Karz et al. | 399/167 |
| 7,499,663 B2 | 3/2009 | Sato et al. | |
| 7,660,550 B2 | 2/2010 | Mori et al. | |
| 7,689,146 B2 | 3/2010 | Sato et al. | |
| 7,720,408 B2 | 5/2010 | Ueno et al. | |
| 7,813,668 B2 | 10/2010 | Ueno et al. | |
| 2003/0053823 A1 | 3/2003 | Cho et al. | |
| 2003/0099485 A1 | 5/2003 | Ahn et al. | |
| 2004/0037590 A1 | 2/2004 | Morioka et al. | |
| 2004/0161261 A1 | 8/2004 | Kasahara et al. | |
| 2006/0029435 A1 | 2/2006 | Kasai et al. | |
| 2006/0257167 A1 * | 11/2006 | Kim et al. | 399/167 |
| 2008/0181678 A1 | 7/2008 | Sato et al. | |

FOREIGN PATENT DOCUMENTS

| | | |
|---|---|---|
| GB | 2 141 520 A | 12/1984 |
| JP | 2004-233492 A | 8/2004 |
| JP | 2005-107413 | 4/2005 |
| KR | 2003-0043141 A | 6/2003 |

OTHER PUBLICATIONS

Office Action in Chinese Patent Application No. 200980118814.2, mailed Jun. 18, 2012 (with English translation).

Office Action in Korean Patent Application No. 10-2010-7026028, mailed Dec. 13, 2012.

Office Action in Chinese Patent Application No. 2009-80118814.2, dated Oct. 15, 2013 (with English translation).

* cited by examiner

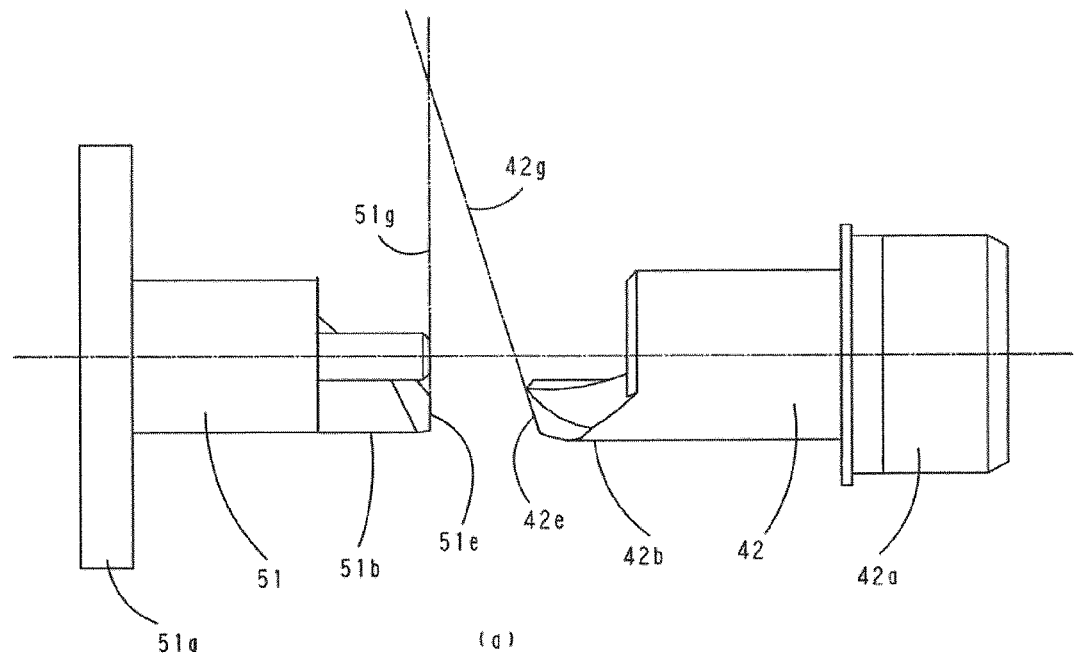
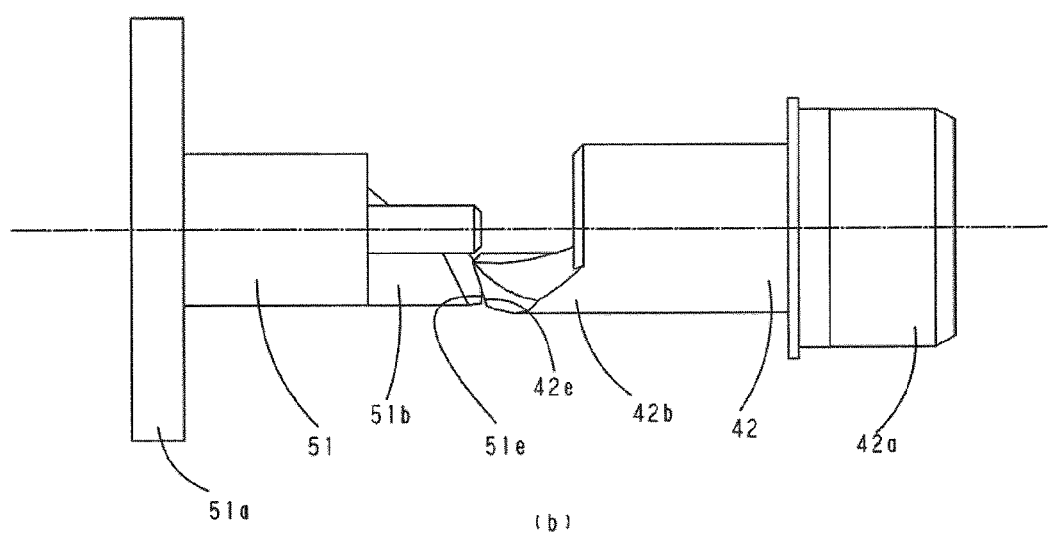
Fig. 8

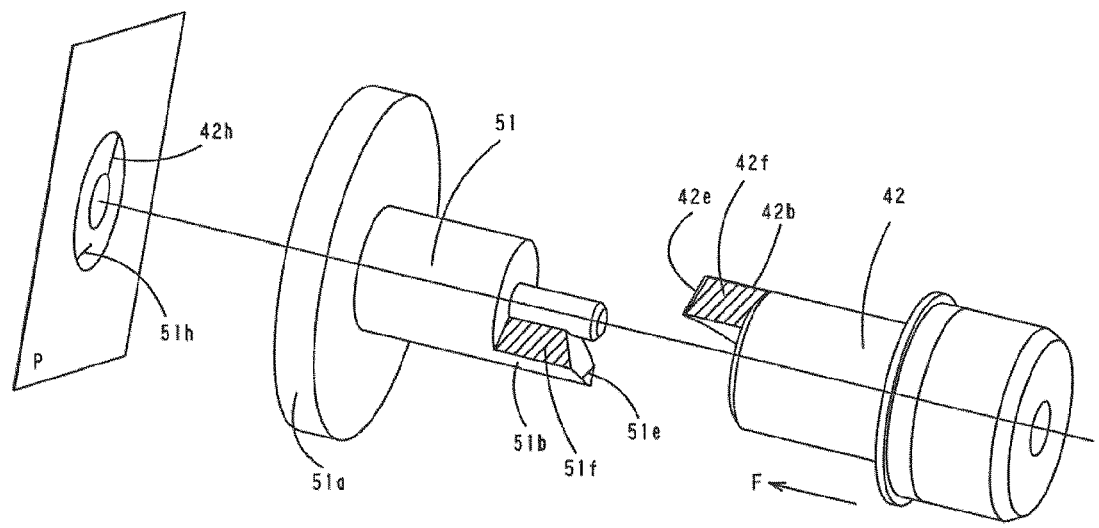
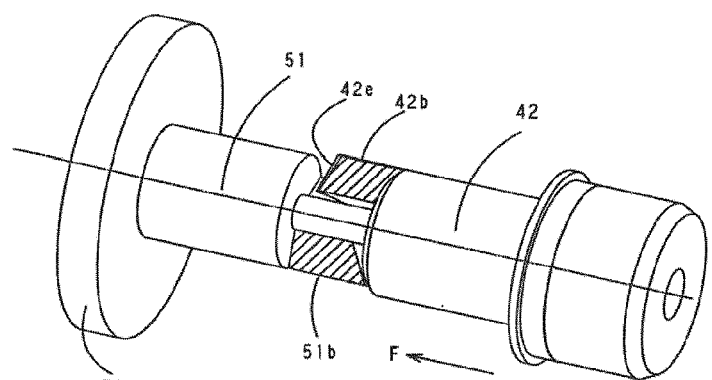
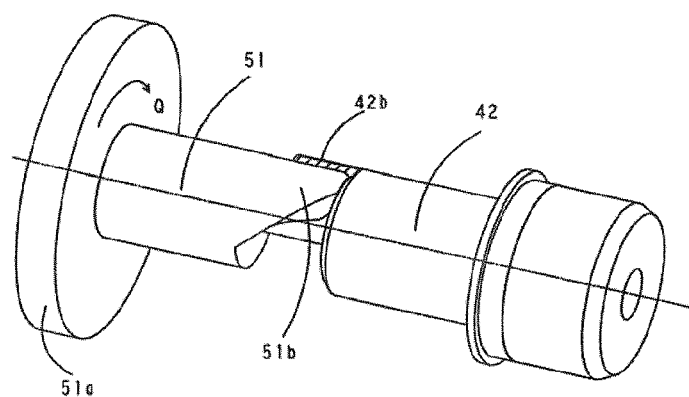
Fig. 10

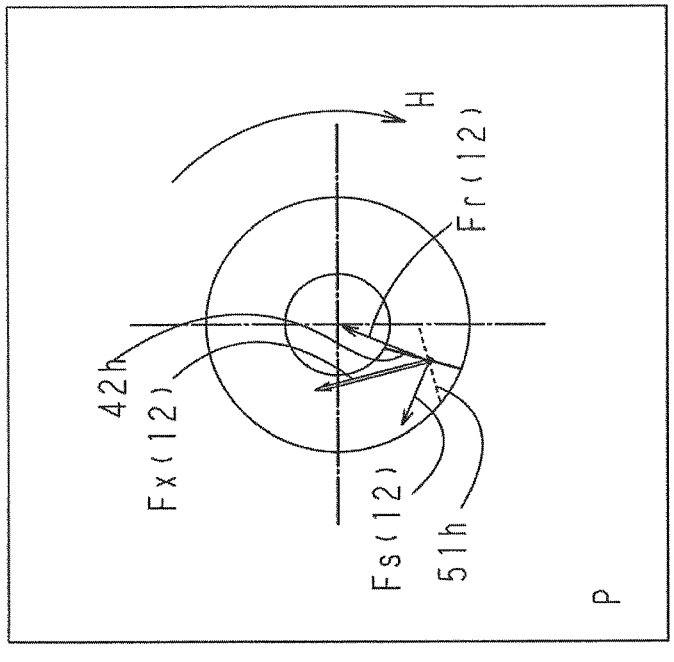
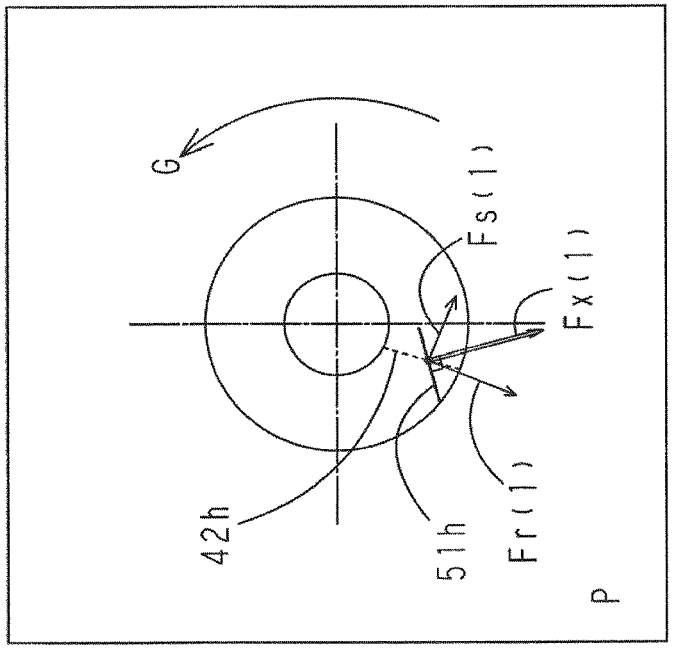
Fig. 13

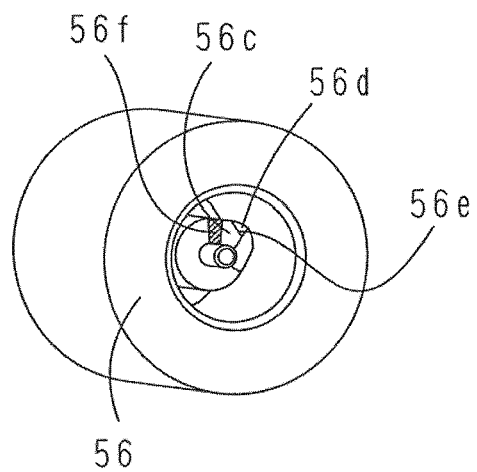
(a)
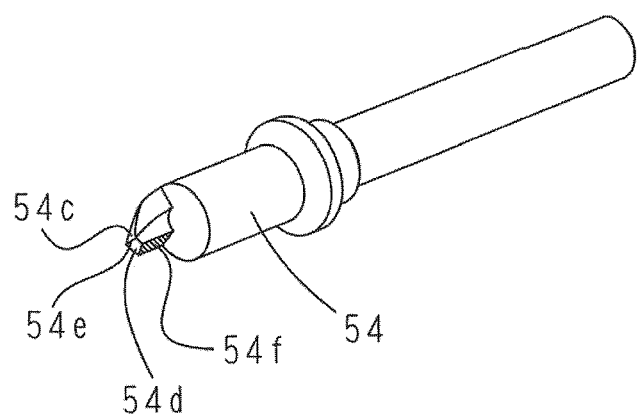
(b)
Fig. 20

CARTRIDGE WITH FIRST AND SECOND COUPLING MEMBERS FOR ENGAGING MAIN ASSEMBLY

TECHNICAL FIELD

The present invention relates to a cartridge used for an electrophotographic image forming apparatus.

As examples of an electrophotographic image forming apparatus, a copying machine, a printer, etc., can be listed, which form an image on recording medium with the use of an electrophotographic method.

BACKGROUND ART

In the field of an electrophotographic image forming apparatus, it is common practice to employ a structural arrangement were one or more among developer, photosensitive member, processing means, etc., are assembled in the form of a cartridge so that they can be removably mountable in the main assembly of an electrophotographic image forming apparatus. A cartridge used with an image forming apparatus is driven by a driving apparatus with which the main assembly of the image forming apparatus is provided. More specifically, the cartridge is driven by the driving apparatus, through a driving force transmitting apparatus, that is, the connective means positioned between the cartridge and the main assembly of an image forming apparatus. The driving force transmitting apparatus is made up of gears, coupling members, etc.

In a case where an image forming apparatus is structured so that a cartridge therefor is to be mounted or dismounted in the direction parallel to the lengthwise direction of the cartridge, it is common practice that one of the lengthwise ends of the cartridge is provided with a coupling member, which functions as a part of the means for transmitting driving force to the cartridge from the main assembly of the image forming apparatus.

Regarding the coupling means structure, a coupling means is made up of two portions, that is, a portion with a protrusion (claw or the like) and a portion with a recess. The protrusion protrudes in parallel to the rotational axis of the coupling. The portion with a recess is rotationally driven by the portion with a protrusion by engaging with the protrusion. In the case of the coupling structured as described above, the coupling portion with a protrusion is attached to the cartridge, and the coupling portion with a recess is attached to the main assembly of the image forming apparatus.

The two coupling portions sometimes fail to couple with each other. That is, the projection sometimes fails to fit into the recess, because of the relationship in terms of rotational phase. More specifically, the two coupling portions interfere with each other in terms of their movement in the direction parallel to their axial lines, and therefore, they sometimes prevent the cartridge from being completely mounted into the main assembly of the image forming apparatus.

Thus, some of the conventional driving force transmitting apparatuses made up of a coupling means are structured so that the portion of the coupling means, which is attached to a cartridge, or the portion of the coupling means, which is attached to the main assembly of an image forming apparatus, is fitted with a spring which allows the corresponding portion of the coupling means to retract in the direction parallel to the axial line of the coupling means if the coupling means interferes with the mounting of the process cartridge into the main assembly of the image forming apparatus (Japanese Laid-open Patent Application 2005-107413). In the case of most of the conventional driving force transmitting apparatuses of the above described type, the portion of the coupling means, which belongs to the main assembly of an image forming apparatus, is provided with a spring which keeps this portion of the coupling means pressed toward a cartridge while allowing the coupling porting to retract in the axial direction of the coupling portion. Further, these driving force transmitting apparatuses are structured so that even if the protruding portion of the coupling means does not properly fit into the recess of the coupling means when a cartridge is mounted into the main assembly of an image forming apparatus, the portion of the coupling means, which belongs to the main assembly of an image forming apparatus, retracts in its axial direction. Therefore, the coupling portion of the cartridge and the coupling portion of the apparatus main assembly do not interfere with the inward movement of the cartridge into the apparatus main assembly in their axial directions, allowing thereby the cartridge to be completely mounted into the apparatus main assembly. The difference in rotational phase between the two coupling portions is eliminated by the rotation of the coupling portion of the apparatus main assembly. Thus, the coupling portion which had retracted is allowed to be moved by the resiliency of the abovementioned spring in the axial direction of the coupling portion (toward cartridge). As a result, the coupling portion with the protrusion, and the coupling portion with the recess, properly engage with each other, making it possible for the driving force to be transmitted.

DISCLOSURE OF THE INVENTION

The primary object of the present invention, which is related to an electrophotographic image forming apparatus, a cartridge for an electrophotographic image forming apparatus, and a coupling means for coupling the main assembly of an electrophotographic image forming apparatus with a process cartridge to transmit driving force from the main assembly to the process cartridge, is provided with a combination of an electrophotographic image forming apparatus and a cartridge, which does not require a space into which the coupling portion of the apparatus main assembly, or the coupling portion of the cartridge, is allowed to retract, and a spring or the like, which is not essential to the engagement of the coupling means, and also, to provide a method for assembly such a cartridge.

According to an aspect of the present invention, there is provided a cartridge detachably mountable to a main assembly of an electrophotographic image forming apparatus, said main assembly including a first coupling member which is rotatable about a first axis and which has a first edge line provided at a free end portion with respect to a diction of the first axis, said cartridge comprising a second coupling member which is rotatable about a second axis and which has a second edge line provided at a free end portion with respect to a direction of the second axis, said second coupling member being engageable with the first coupling member to receive a driving force form the first coupling member; and a rotatable member rotatable by the driving force received by said second coupling member; wherein when the first edge line and the second edge line are contacted to each other before the first coupling member and said second coupling member are engaged with each other, upon mounting said cartridge to the main assembly of the apparatus so as to bring said second coupling member close to the first coupling member in a state in which the first axis and the second axis are substantially aligned with a common phantom line, (i) the first edge line and the second edge line projected on a first phantom plane including the phantom line are crossed with each other, and (ii) the first edge line and the second edge line projected on a second phantom plane perpendicular to the phantom line are crossed with each other, and at least one of a normal line of the first edge line and a normal at a second edge line at a crossing point does not pass through the phantom line.

According to another aspect of the present invention, there is provided a cartridge detachably mountable to a main assembly of an electrophotographic image forming apparatus, said cartridge comprising a cartridge frame for accommodating a developer; a gear member; a first coupling member which is rotatable about a first axis and which has a first edge line provided at a free end portion with respect to a diction of the first axis, and a gear portion engaging with said gear member; a second coupling member which is rotatable about a second axis and which has a second edge line provided at a free end portion with respect to a direction of the second axis, said second coupling member being engageable with said first coupling member to receive a driving force from said first coupling member; and a stirring member for receiving the driving force from said second coupling member to stir the developer in said cartridge frame; wherein when the first edge line and the second edge line are contacted to each other before the first coupling member and said second coupling member are engaged with each other while bring said gear portion into engagement with said gear member, upon bring said second coupling member close to the first coupling member in a state in which the first axis and the second axis are substantially aligned with a common phantom line, (i) the first edge line and the second edge line projected on a first phantom plane including the phantom line are crossed with each other, and (ii) the first edge line and the second edge line projected on a second phantom plane perpendicular to the phantom line are crossed with each other, and at least one of a normal line of the first edge line and a normal at a second edge line at a crossing point does not pass through the phantom line.

These and other objects, features, and advantages of the present invention will become more apparent upon consideration of the following description of the preferred embodiments of the present invention, taken in conjunction with the accompanying drawings.

BRIEF DESCRIPTION OF THE DRAWINGS

FIG. 8(a) is a side view of the driving apparatus transmitting apparatus, in the first embodiment, the driving force transmitting and driving force receiving portion of which are not in engagement with each other. FIG. 8(b) is a side view of the driving apparatus transmitting apparatus, in the first embodiment, the driving force transmitting and driving force receiving portion of which are in engagement with each other.

FIGS. 10(a), 10(b), and 10(c) are perspective views of the driving force transmitting apparatus in the first embodiment.

FIGS. 13(a) and 13(b) are plan views of the driving force transmitting apparatus in the first embodiment.

FIGS. 20(a) and 20(b) are perspective views of the driving force transmitting portion and driving force receiving portion, respectively, of the driving force transmitting apparatus in the second embodiment.

BEST MODE FOR CARRYING OUT THE INVENTION

Embodiment 1

Figure 1:
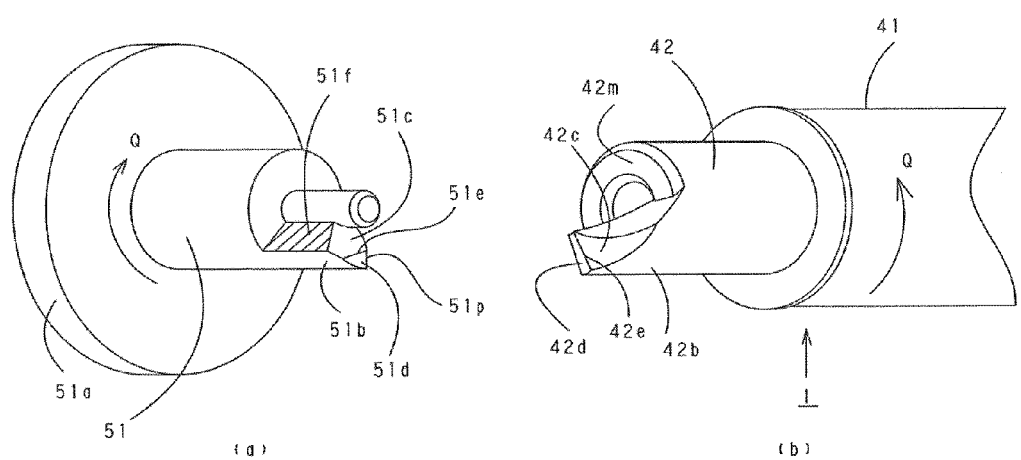
FIG. 1 is a perspective view of the driving force transmitting apparatus in the first preferred embodiment of the present invention.

First, referring to the appended drawings, an electrophotographic color image forming apparatus (which hereafter may be referred to simply as image forming apparatus) in the first preferred embodiment of the present invention will be described. More specifically, the main assembly of the image forming apparatus, and the cartridges therefor, in the first embodiment will be described.

(Overall Structure of Image Forming Apparatus)

First, referring to FIG. 2, the overall structure of the image forming apparatus will be described. The image forming apparatus 100 shown in FIG. 2 has four cartridge chambers 22 (22a-22d) as its internal cartridge mounting spaces, in which four cartridges 7 (7a-7d) are removably mountable, one for one. The four cartridge chambers 22 are arranged in tandem at an angle relative to the horizontal direction. Each cartridge 7 is provided with an electrophotographic photosensitive member 1 (1a, 1b, 1c, or 1d).

The electrophotographic photosensitive drum 1 (which hereafter will be referred to simply as photosensitive drum 1) is rotationally driven by a driving member (unshown) in the clockwise direction of the drawings. The main assembly 100A of the image forming apparatus 100 is also provided with the following processing means, more specifically, cleaning members 6 (6a-6d), charge rollers 2 (2a-2d), and development units 4 (4a-4d), which act on the photosensitive drums, one for one. The cleaning member 6 removes the developer (toner) remaining on the peripheral surface of the photosensitive drum 1 after transfer. The charge roller 2 uniformly charges the peripheral surface of the photosensitive drum 1. The development unit 4 develops an electrostatic latent image (which is formed on photosensitive drum 1) with the use of toner. The process cartridge 7 is structured so that the abovementioned processing means are in the adjacencies of the peripheral surface of the photosensitive drum 1. On the other hand, the main assembly 100A of the image forming apparatus 100 is provided with a scanner unit 3 and an intermediary transfer belt 5. The scanner unit 3 forms an electrostatic latent image on the photosensitive drum 1 by projecting a beam of laser light while modulating the beam of laser light with the information regarding the image to be formed. The intermediary transfer belt 5 is the belt onto which four toner images, different in color, formed on the photosensitive drums 1, one for one, are sequentially transferred in layers. The photosensitive drum 1, cleaning member 6, charge roller 2, and development unit 4 are integrally disposed in a cartridge, making up a process cartridge 7 (which hereafter will be referred to simply as cartridge 7). The main assembly 100A of the image forming apparatus 100, and the process cartridge 7, are structured so that the latter can be removably mountable in the former by a user.

The intermediary transfer belt 5 is suspended by a driving roller 10 and a tension roller 11, being stretched between the two rollers 10 and 11. The main assembly 100A is also provided with four primary transfer rollers 12 (12a-12d), which are inside the loop which the intermediary transfer belt 5 forms. The four primary transfer rollers 12 are disposed so that they oppose the photosensitive drums 1 (1a-1d), one for one, with the presence of the intermediary transfer belt 5 between them and the photosensitive drums 1. To the intermediary transfer belt 5, a transfer bias is applied by a bias applying means (unshown).

The photosensitive drums 1 and intermediary transfer belt 5 are rotated in the directions indicated by arrow marks Q and R, respectively, while toner images are formed on the photosensitive drums 1, one for one. As a positive bias is applied to the primary transfer rollers 12, the toner images formed on the photosensitive drums 1 are sequentially transferred (primary transfer) onto the intermediary transfer belt 5. As a result, four toner images, different in color, are layered on the intermediary transfer belt 5. Then, the layered four toner images are conveyed to a secondary transfer portion 15 by the rotation of the intermediary transfer belt 5.

Meanwhile, a sheet S of recording medium is fed into the main assembly 100A by a sheet feeding apparatus 13, and is conveyed in synchronism with the progression of the above described image forming operation, by a sheet conveying means made up of a pair of registration rollers 17. The sheet feeding apparatus 13 has: a sheet feeding cassette 24, in which the sheet S is stored; a feeding roller 8, which feeds the sheet S into the main assembly 100A; and a pair of sheet conveying rollers 16, which conveys the fed sheet S further into the main assembly 100A. The sheet feeding cassette 24 can be pulled out of the main assembly 100A by pulling it frontward of the main assembly 100A. The sheets S in the sheet feeding cassette 24 are kept pressed against the feeding roller 8, and the sheet S, which is in contact with the feeding roller 8, is separated from the rest by a separation pad 9 (separating method based on friction), to be conveyed further into the main assembly 100A.

After being fed into the main assembly 100A by the sheet feeding apparatus 13, the sheet S is conveyed to a secondary transfer portion 15 by the pair of registration rollers 17. In the secondary transfer portion 15, a positive bias is applied to a secondary transfer roller 18, whereby the four toner images, different in color, on the intermediary transfer belt 5 are transferred (secondary transfer) onto the sheet S.

A fixing portion 14, which is a fixing means, is the portion that fixes the toner images on the sheet S by applying heat and pressure to the sheet S and the toner images thereon. A fixation belt 14a is cylindrical, and is guided by a belt guiding member (unshown) having a heating means, such as a heater, adhered to the belt guiding member. The fixation belt 14a and a pressure roller 14b are kept pressed against each other by the application of a preset amount of pressure, forming thereby a fixation nip.

After the formation of the unfixed toner images on the sheet S in the image forming portion, the sheet S is conveyed to the fixing portion 14, and is conveyed through the fixation nip, while being subjected to the heat and pressure. As a result, the unfixed toner images on the sheet S are fixed to the sheet S. Thereafter, the sheet S, to which the toner images have just been fixed, is discharged into a delivery tray 20 by a pair of discharge rollers 19.

Meanwhile, the toner remaining on the peripheral surface of each photosensitive drum 1 after the toner image transfer is removed by the cleaning member 6. The removed toner is recovered into a chamber for removed toner, which is a part of one of the latent image formation units 26 (26a-26d).

As for the toner remaining on the intermediary transfer belt 5 after the transfer (second transfer) of the toner images onto the sheet S, it is removed by a transfer belt cleaning apparatus 23. The removed toner is recovered into a waste toner recovery container (unshown) located in the rear portion of the main assembly 100A.

Figure 2:
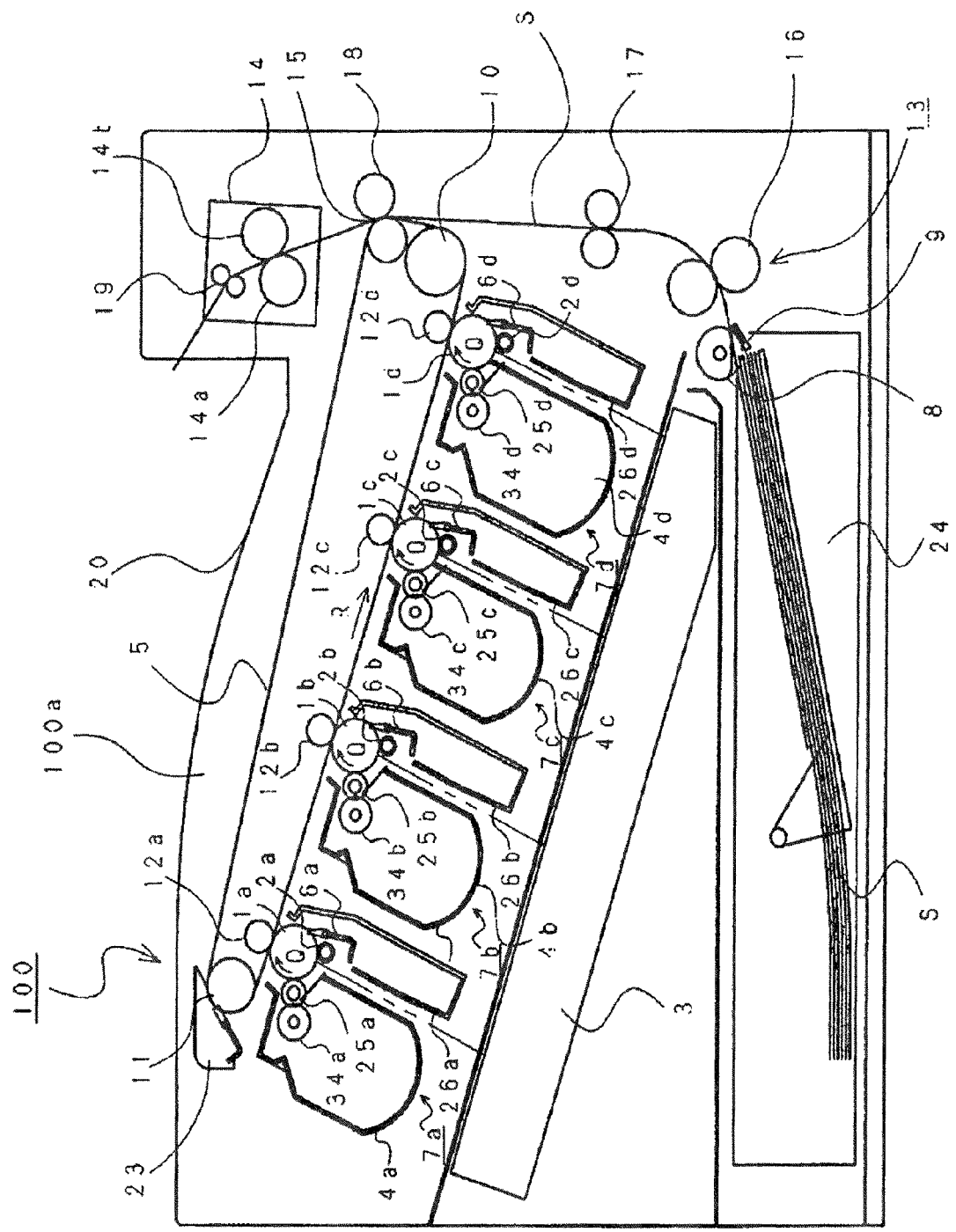
FIG. 2 is a schematic sectional view of the image forming apparatus in the first preferred embodiment.

Incidentally, FIG. 2 shows the intermediary transfer belt 5 as an intermediary transfer unit having the intermediary transferring member and the boxy member related to the intermediary transferring member. However, it is possible to employ a transferring-and-conveying unit, instead of the above-described intermediary transfer unit. The transferring-and-conveying unit has a transferring-and-conveying member, and a box related to the transferring-and-conveying member. The transferring-and-conveying unit transfers toner images onto the transfer sheet S by positioning the transfer sheet S so that the sheet S faces the peripheral surface of the photosensitive drum 1.

(Cartridge)

Figure 3:
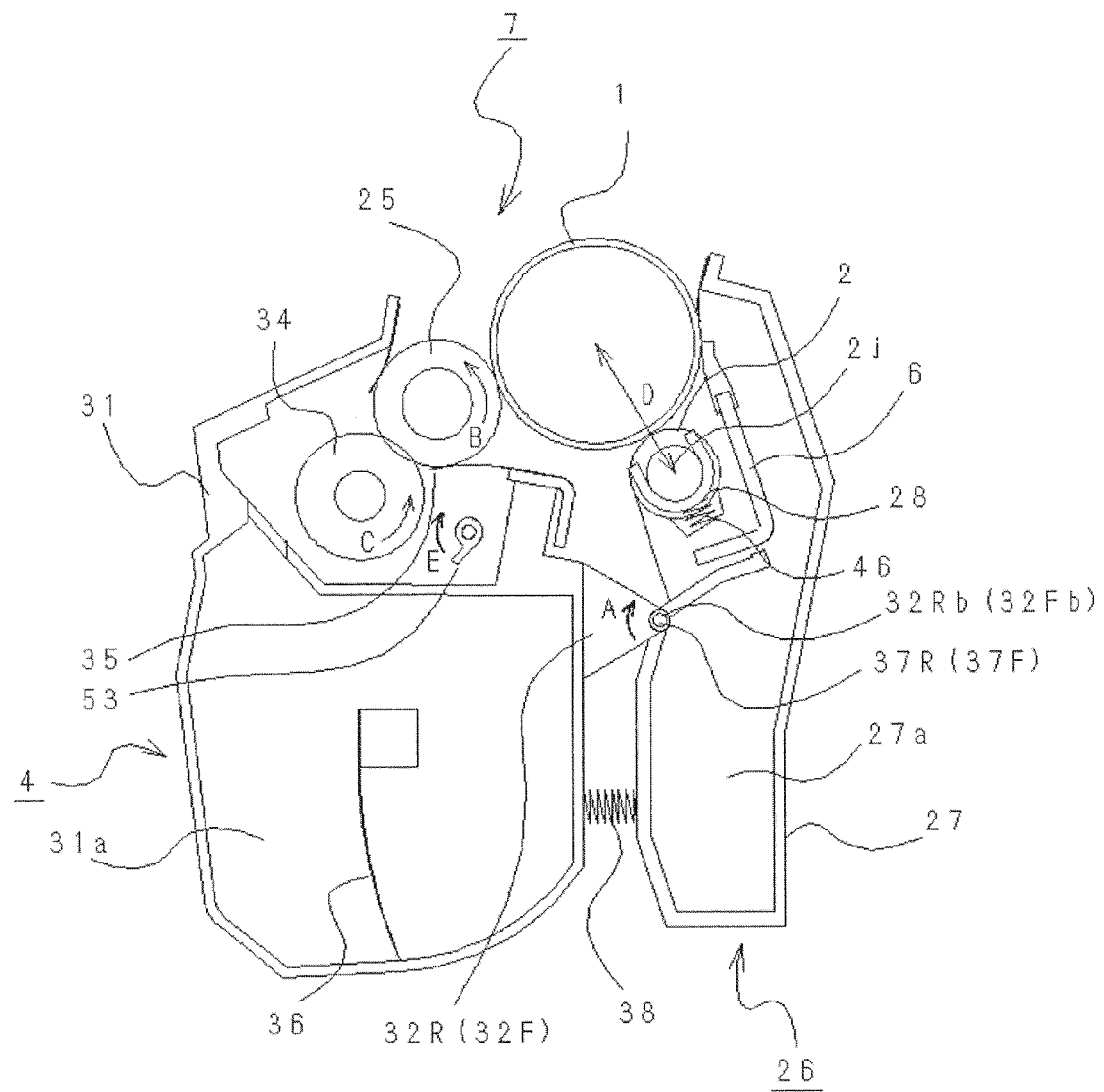
FIG. 3 is a schematic sectional view of the process cartridge in the first embodiment.

Next, referring to FIG. 3, the cartridge 7 in this embodiment will be described. FIG. 3 is a sectional view of the cartridge 7 at a plane perpendicular to the lengthwise direction of the cartridge 7. The cartridge 7 contains toner t. The cartridges 7a, 7b, 7c, and 7d, in which yellow, magenta, cyan, and black toners t, are stored, respectively, are the same in structure.

Each cartridge 7 is made up of the latent image formation unit 26 and development unit 4. The latent image formation unit 26 is provided with the photosensitive drum 1, charge roller 2 (charging means), and cleaning member 6 (cleaning means). The development unit 4 has the development roller 25 (developing means).

The photosensitive drum 1 is rotatably attached to the cleaning means frame portion 27 of the latent image formation unit 26, with the bearings 40 (40a-40d) and 50 (50a-50d) (FIG. 4) disposed between the cleaning means frame portion 27 and the photosensitive drum 1. During an image forming operation, the photosensitive drum 1 is rotated by transmitting driving force to the photosensitive drum 1 from a motor (unshown), which the apparatus main assembly 100A is provided for driving the latent image formation unit 26. There are the charge roller 2 and cleaning member 6 in the adjacencies of the peripheral surface of each photosensitive drum 1 as described above. As the transfer residual toner, more specifically, the toner remaining on the peripheral surface of the photosensitive drum 1 after the image transfer, is removed by the cleaning member 6, it falls into a storage chamber 27a for the removed toner. A pair of charge roller bearings 28 are attached to the cleaning means frame portion 27 in such a manner that they can be moved in the direction indicated by an arrow mark D which coincides with the axial line of the photosensitive drum 1 and the axial line of the charge roller 2. The shaft 2j (rotational axle) of the charge roller 2 is rotatably supported by the pair of charge roller bearings 28. Further, the charge roller bearings 28 are kept pressed toward the photosensitive drum 1 by a pair of charge roller pressing members 46.

The development unit 4 has a development roller 25 and a development unit frame 31. The development roller 25 rotates in contact with the photosensitive drum 1 in the direction indicated by an arrow mark B. The development roller 25 is rotatably supported by the development unit frame 31 with a pair of bearings 32 (32R and 32L) disposed between the lengthwise end portions (in terms of axial direction of development roller 25) and the right and left walls of the development unit frame 31, respectively. Further, the development unit 4 is provided with a toner supply roller 34 and a development blade 35, which are disposed in the adjacencies of the peripheral surface of the development roller 25. The toner supply roller 34 rotates in contact with the development roller 25 in the direction indicated by an arrow mark C. The development blade 35 is for regulating in thickness the layer of toner on the peripheral surface of the development roller 25. Further, the development unit 4 is provided with a toner conveying member 36 for conveying the toner in the development unit 4 to the abovementioned toner supply roller 34 while stirring the toner. The toner conveying member 36 is disposed in the toner storage portion 31a of the development unit frame 31.

The development unit 4 is connected to the latent image formation unit 26 with the use of a pair of shafts 37 (37R and 37F) put through the holes 32Rb and 32Fb with which the bearings 32R and 32F are provided, respectively, in such a manner that the two units 4 and 26 are enabled to rotationally move relative to each other about the pair of shafts 37. The development unit 4 is kept under the pressure by a pair of compression springs 38. Thus, as the cartridge 7 is mounted into the apparatus main assembly 100A, the development unit 4 rotates about the pair of shafts 37 in the direction indicted by an arrow mark A, causing the development roller 25 to come into contact with the photosensitive drum 1, and also, ensuring that the development roller 25 remains in contact with the photosensitive drum 1 during image formation.

(Driving Force Transmitting Apparatus)

Figure 5:
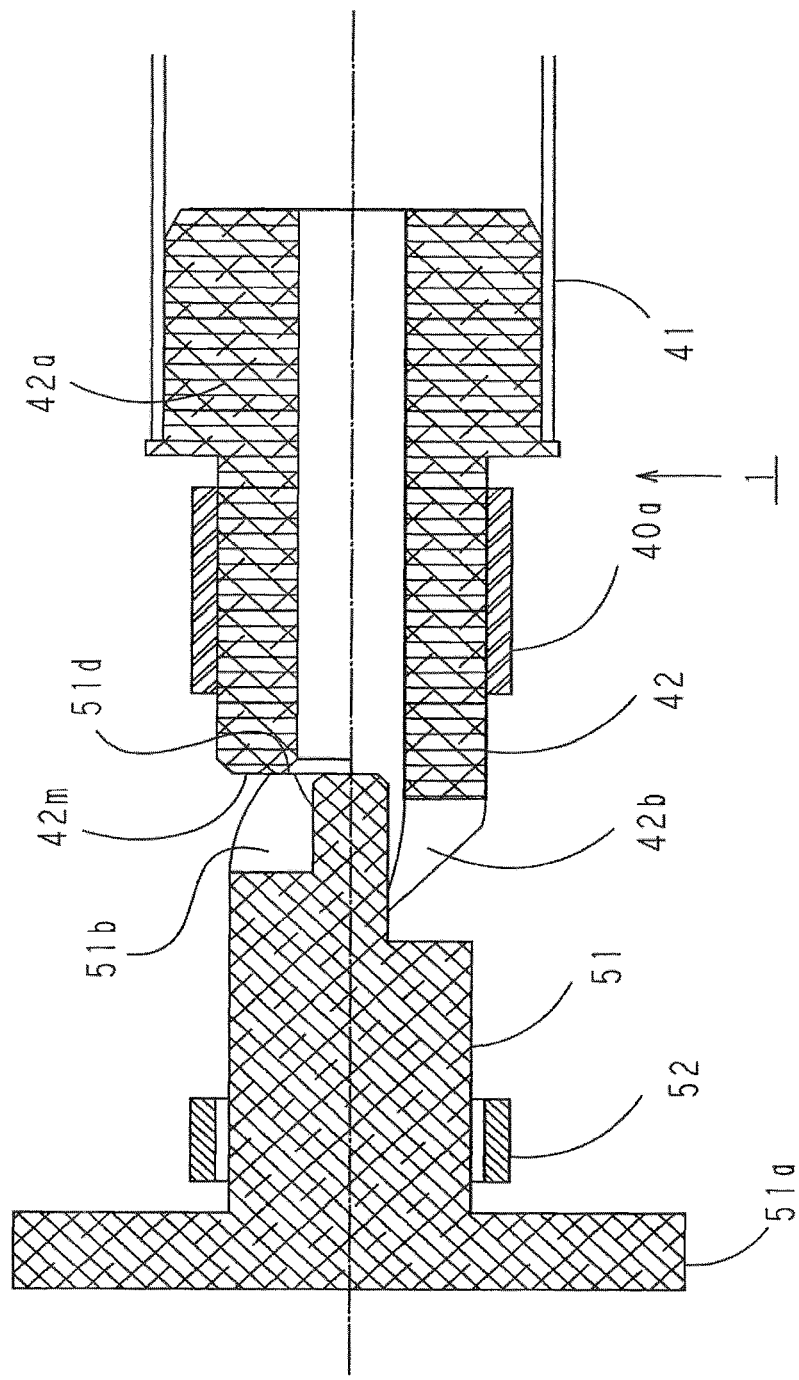
FIG. 5 is a sectional view of the driving force transmitting apparatus in the first embodiment.

Next, the driving force transmitting apparatus in the first preferred embodiment of the present invention will be described. The driving force transmitting apparatus is in the form of a coupling made up of a portion or portions attached to one of the lengthwise ends of the process cartridge, and a portion or portions attached to the portion of the apparatus main assembly corresponding to the cartridge portion of the coupling. This embodiment will be described referring to a case in which driving force is transmitted from the main assembly 100A of the image forming apparatus 100 to the photosensitive drum 1 of the cartridge 7. FIG. 1 is a perspective view of the driving force transmitting apparatus in accordance with the present invention. FIG. 5 is a sectional view of the driving force transmitting apparatus, and its adjacencies, in the first embodiment.

Figure 4:
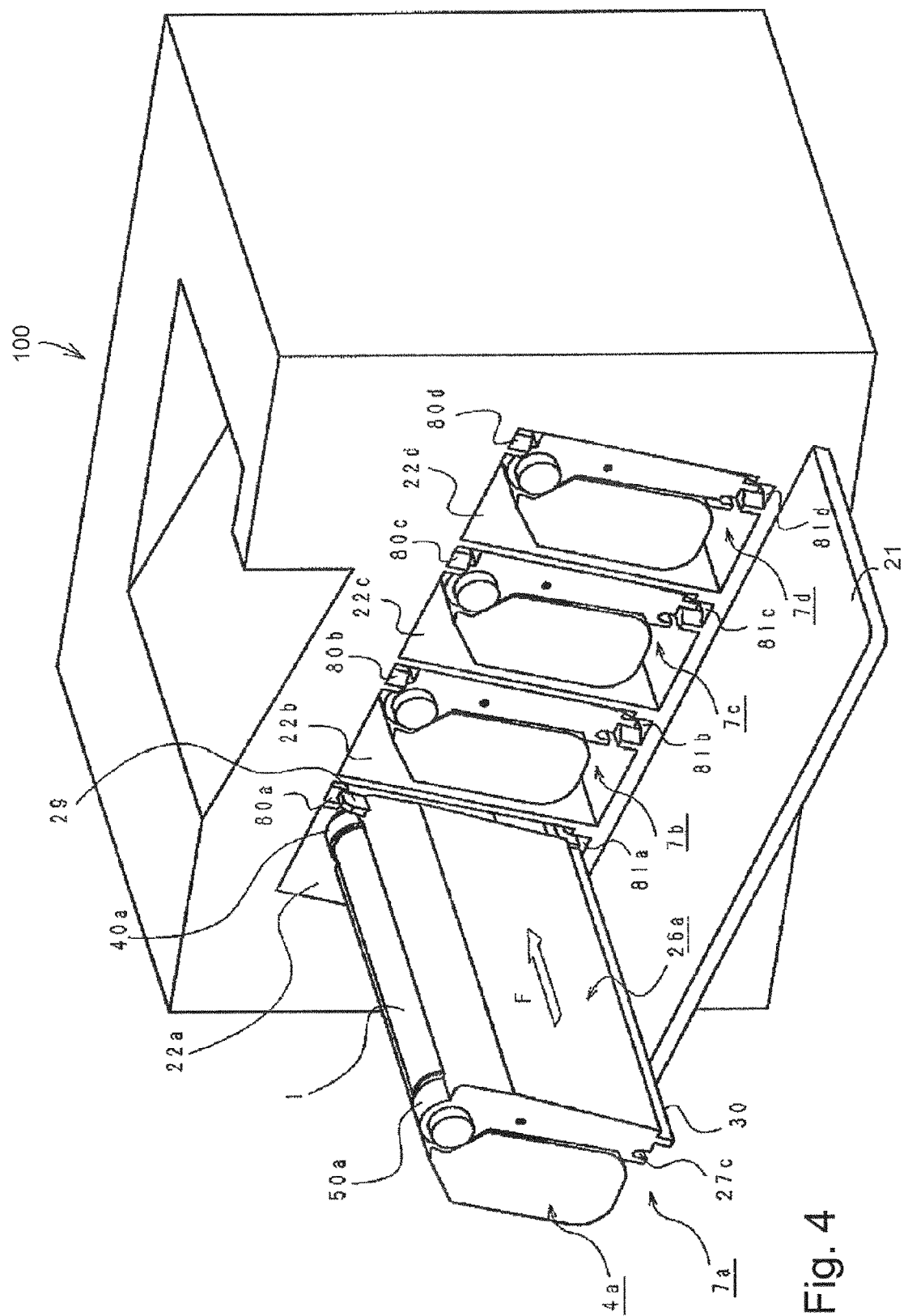
FIG. 4 is a perspective view of the image forming apparatus in the first embodiment.

Referring to the abovementioned drawings, the photosensitive drum 1 is made up of a drum cylinder 41, and a drum flange 42. The drum flange 42 is a second coupling member, and is solidly attached to one end of the drum cylinder 41 by pressing one end 42a of the drum flange 42 into the end of the drum cylinder 41. The combination of the drum cylinder 41 and second coupling member makes up a part of the latent image formation unit 26. The other lengthwise end 42b of the drum flange 42 is a driving force receiving portion, by which the latent image formation unit 26 receives the force transmitted thereto to drive the latent image formation unit 26 (details regarding this transmission will be described later). The photosensitive drum 1 is rotatably supported at its lengthwise ends (FIG. 5 shows only one of lengthwise ends) by a pair of drum bearings 40a and 50a (FIG. 4). Thus, the drum flange 42, which is the second coupling member, is rotatable about an axis (second axial line). The drum bearings 40a and 50a, and the cleaning means frame portion 27 shown in FIG. 3, are parts of the latent image formation unit 26.

On the other hand, the apparatus main assembly 100A is provided with the first coupling member 51 which transmits to the drum flange 42 the force for driving the photosensitive drum 1. The first coupling member 51 is rotatably supported by a bearing 52 fixed to the unshown portion of the frame of the apparatus main assembly 100A. Thus, the first coupling member 51 is rotatable about an axis (first axial line). The first coupling member 51 has a gear 51a, which makes up one of the lengthwise ends of the first coupling member 51, being structured so that the driving force from the driving force source (motor or the like), with which the apparatus main assembly 100A is provided, is transmitted to the first coupling member 51 through a gear (unshown). The other lengthwise end 51b of the first coupling member 51 is provided with a driving force transmitting portion for transmitting the driving force to the photosensitive drum 1.

Next, the driving force transmitting portion of the first coupling member 51 of the apparatus main assembly 100A, and the driving force receiving portion of the second coupling member 42 of the photosensitive drum 1, will be described in detail.

Figure 6:
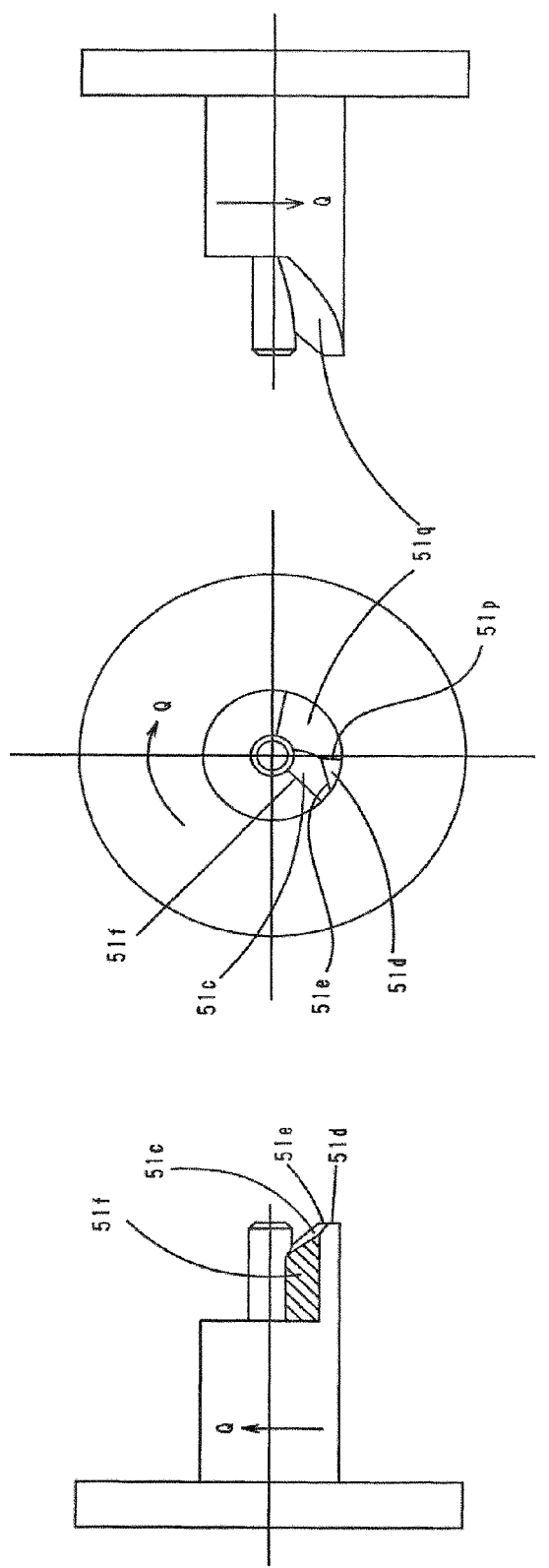
FIG. 6(a) is a side view of the driving force transmitting portion of the driving force transmitting apparatus in the first embodiment.
FIG. 6(b) is a plan view of the same driving force transmitting portion, as seen from the direction to which driving force is transmitted.
FIG. 6(c) is a side view of the same driving force transmitting portion, as seen from the opposite direction from the direction in which the driving force transmitting portion is seen in FIG. 6(a).

The end portion 51b of the first coupling member 51 has a first ridge 51e, which is where the flat surfaces 51c and 51d of the first coupling member 51 meet (FIGS. 1(a) and 6). Further, the end portion 51b has a driving force transmitting surface 51f, which is a first driving force transmitting portion of the end portion 51b. The driving force transmitting surface 51f is for transmitting the driving force to the second coupling member 42 when the first coupling member 51 is rotated in the direction indicated by an arrow mark Q. In terms of the direction parallel to the axial line of the first coupling member 51, and also, in terms of the direction in which the driving force is transmitted, the first ridge 51e is the leading edge (on first coupling member side) of the driving force transmitting surface 51f. However, the first coupling member 51 may be structured so that the first ridge 51e is another of the edges of the driving force transmitting surface 51f.

Figure 7:
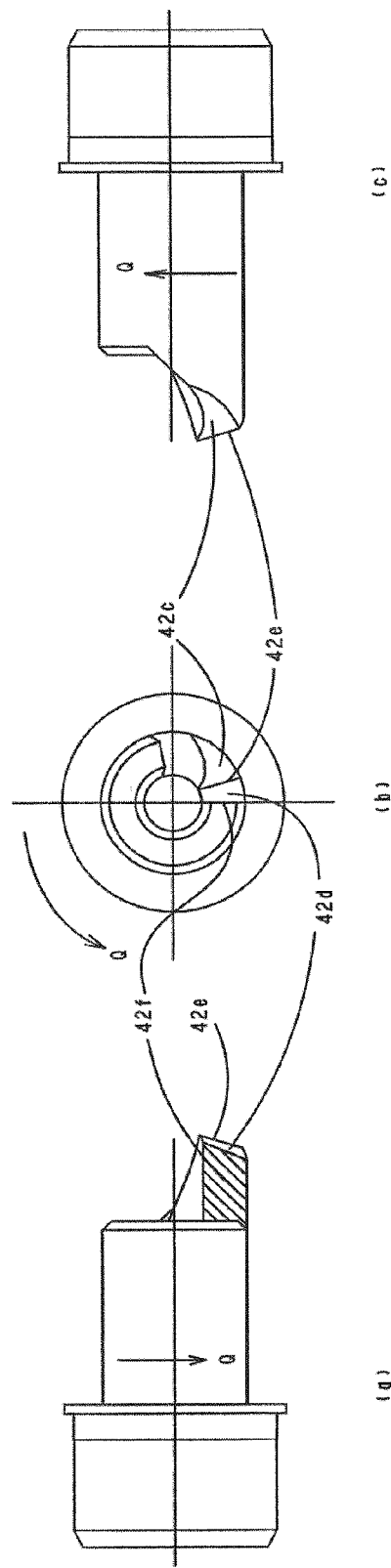
FIG. 7(a) is a side view of the driving force receiving portion of the driving force transmitting apparatus in the first embodiment.
FIG. 7(b) is a plan view of the same driving force receiving portion, as seen from the direction from which driving force is transmitted.
FIG. 7(c) is a side view of the same driving force receiving portion, as seen from the opposite direction from the direction in which the driving force receiving portion is seen in FIG. 7(a).

On the other hand, the end portion 42b of the second coupling member 42 has a second ridge 42e, which is where the flat surfaces 42c and 42d of the second coupling member 42 meet (FIGS. 1(b) and 7). Further, the second coupling member 42 has a driving force receiving surface 42f, which is a second driving force transmitting portion (driving force receiving portion). The driving force receiving surface 42f receives the driving force from the first coupling member 51 by coming into contact with the driving force transmitting surface 51f of the first coupling member 51. In terms of the direction parallel to the axial line of the second coupling member 42, and also, in terms of the direction in which the driving force is transmitted, the second ridge 42e is at the trailing edge (second coupling member side) of the driving force transmitting surface 42f. However, the second coupling member 42 may be structured so that the second ridge 42e is one of the other edges of the driving force receiving surface 42f.

Next, referring to FIGS. 8 and 9, the positional relationship between the first ridge 51e of the first coupling member 51, and the second ridge 42e of the second coupling member 42 will be described.

FIG. 8(a) is a side view of the combination of the first coupling member 51 and second coupling member 42, as seen from the direction perpendicular to their axial lines (virtual line which coincides with abovementioned first and second axial lines). That is, it is a projection of the combination of the first coupling member 51 and second coupling member 42, upon a first virtual plane, which coincides the axial lines (virtual axial lines) of the first and second coupling members, when the first and second coupling members 51 and 42 are not in contact with each other (they are in their separative positions). The first ridge 51e and second ridge 42e are not parallel to each other. The first coupling member 51 and second coupling member 42 are structured so that a line 51g, which is a virtual extension of the first ridge 51e, and a line 42g, which is a virtual extension of the second ridge 42e, never fails to intersect with each other.

FIG. 8(b) is a projection of the combination of the first coupling member 51 and second coupling member 42, upon the above described first virtual plane, when the first and second ridges 51e and 42e, respectively, are in contact with each other.

Figure 9:
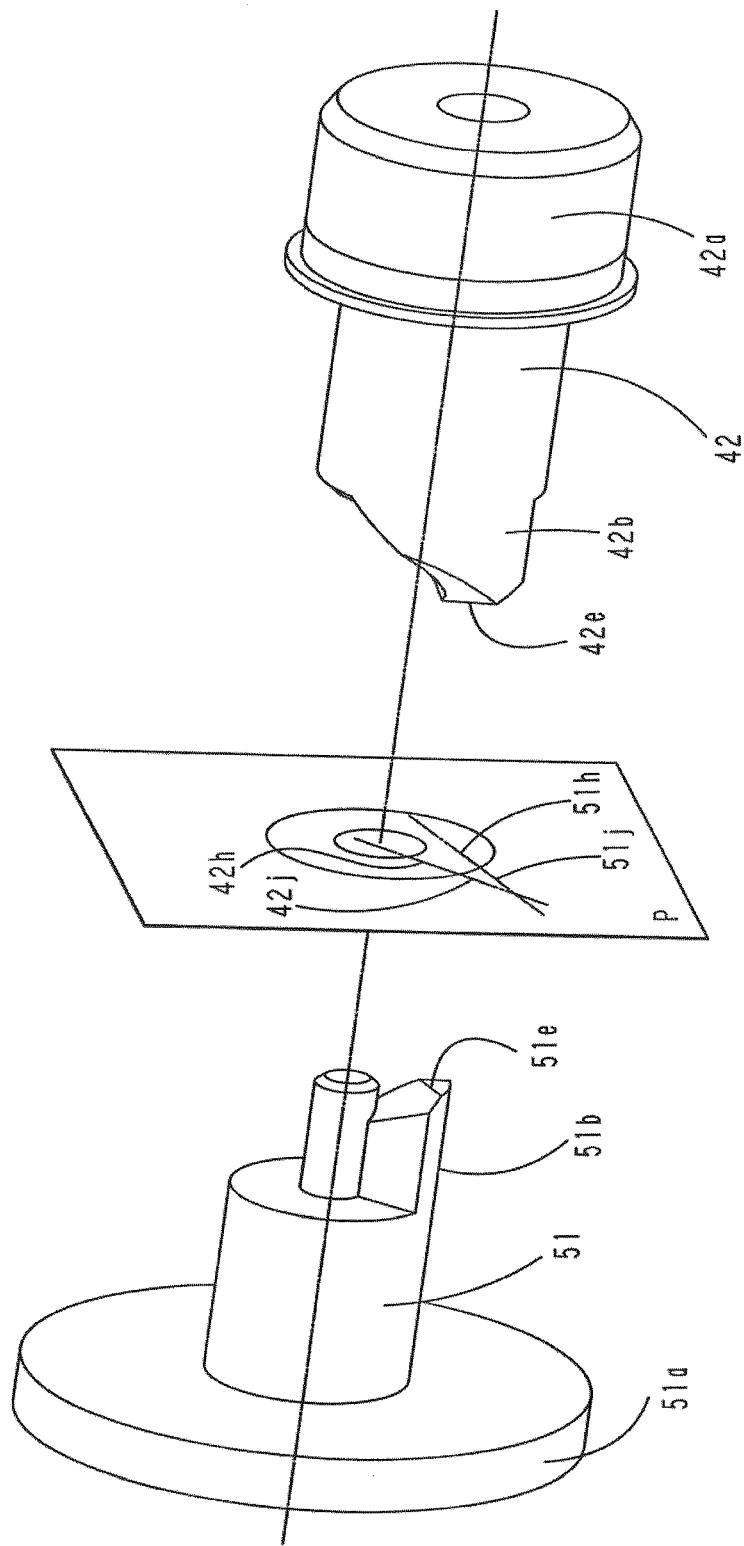
FIG. 9 is a perspective view of the driving force transmitting apparatus in the first embodiment.

FIG. 9 is a perspective view of the first and second coupling members 51 and 42, respectively. A virtual flat plane P in FIG. 9 is the second virtual plane, the normal line of which is parallel to the rotational axis of the driving force transmitting coupling. A line segment 51h is the projection of the first ridge 51e upon the virtual plane P, and a line segment 42h is the projection of the second ridge 42e upon the virtual plane P. The line segments 51h and 42h become cross-sectional to each other, or parallel to each other, depending on the relationship between the first coupling member 51 and second coupling member 42 in terms of their rotational phase. FIG. 9 represents a case where the extensions 51j and 42j of the line segment 51h and the extension of the line segment 42h, respectively, intersect with each other.

Next, referring to FIGS. 10 and 11, the positional relationship between the first coupling member 51 and second coupling member 42 when the two coupling members are in engagement with each other will be described regarding the case (FIG. 10) in which the first ridge 51e and second ridge 42e are intersectional to each other as seen from their axial directions, and the case (FIG. 11) in which the first ridge 51e and the second ridge 42e are not intersectional to each other.

FIG. 10 represents the case where the first ridge 51e and second ridge 42e are not intersectional to each other, as seen from the direction parallel to the axial lines of the first and second coupling members 51 and 42, respectively, when the first and second coupling members 51 and 42, respectively, are in engagement with each other. In this case, the line segments 51h and 42h, which are the projections of the first and second ridges 51e and 42e, respectively, upon the virtual plane P, the normal line of which is parallel to the axial lines of the first and second coupling members 51 and 42, respectively (FIG. 10(a)). FIG. 10(b) shows the first and second coupling members 51 and 42, respectively, after the second coupling member 42 was moved to the first coupling member 51 in the direction indicated by an arrow mark F in order to engage the first coupling member 51 and second coupling member 42 with each other, with the abovementioned first and second axial lines kept coincident with the same virtual line. In this case, the second coupling member 42 can be moved to the first coupling member 51, with no contact between the first ridge 51e and second ridge 42e, that is, with no interference between the two members 42 and 51, until the driving force transmitting surfaces 51f and 42f of the first and second coupling members 51 and 42, respectively, completely overlap with each other in terms of the direction perpendicular to the axial lines of the two coupling members 51 and 42. Thereafter, the first coupling member 51 receives the driving force from the apparatus main assembly 100A, and rotates in the direction indicated by the arrow mark Q in FIG. 10(c). Thus, the driving force transmitting surface 51f of the first coupling member 51 comes into contact with the driving force transmitting surface 42f of the second coupling member 42, whereby the driving force is transmitted from the first coupling member 51 to the second coupling member 42.

Figure 11:
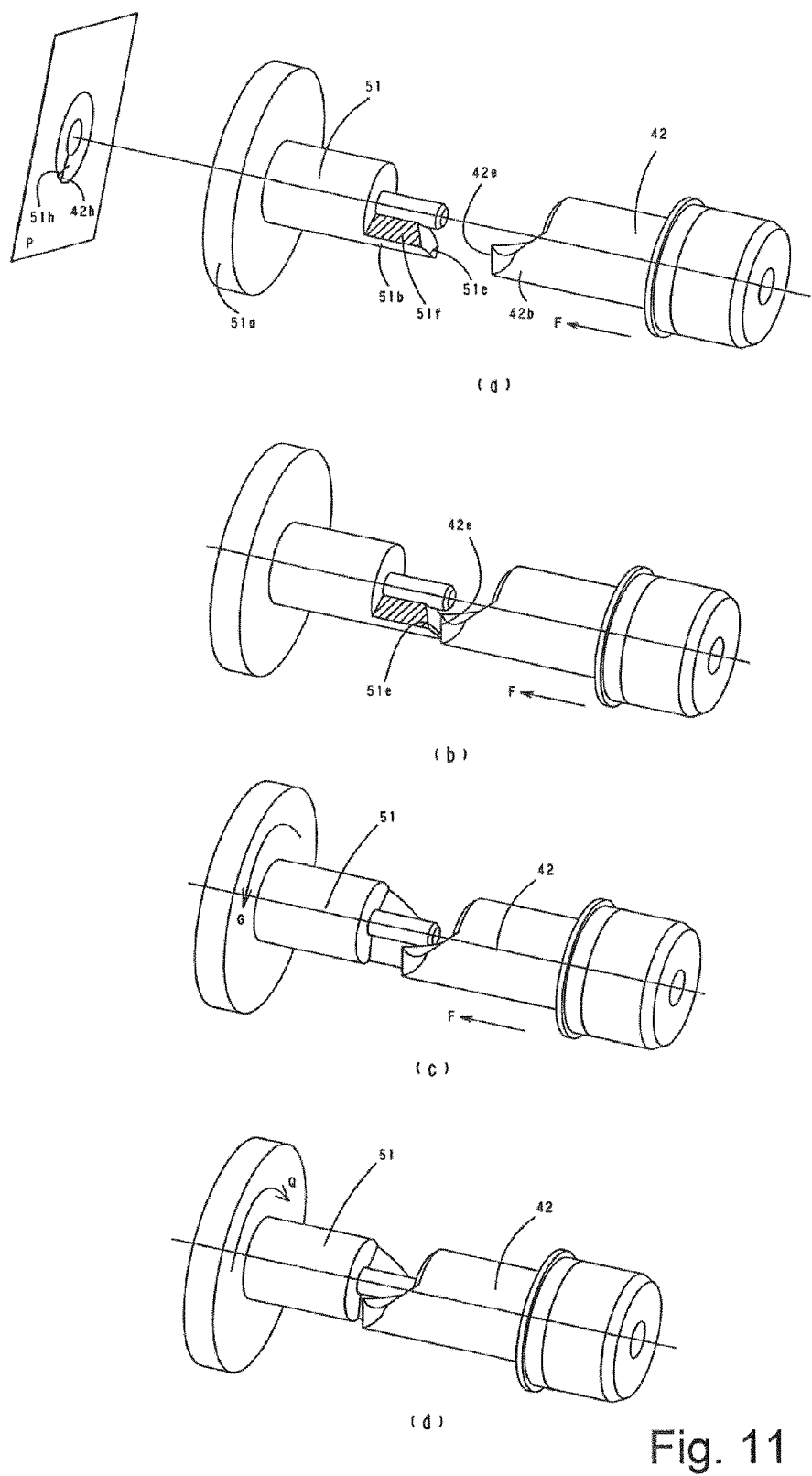
FIGS. 11(a), 11(b), 11(c), and 11(d) are perspective views of the driving force transmitting apparatus in the first embodiment.

Represented by FIG. 11 is the case where the first ridge 51e and second ridge 42e are intersectional to each other, as seen from the direction parallel to the axial lines of the first coupling member 51 and second coupling member 42, when the second coupling member 42 is in engagement with the first coupling member 51. In this case, the line segments 51h and 42h, which are the projections of the first and second ridges 51e and 42e, respectively, upon the virtual plane P, are intersectional to each other (FIG. 11(a)). FIG. 11(b) shows the first coupling member 51 and second coupling member 42 after the second coupling member 42 was moved to the first coupling member 51 in the direction indicated by an arrow mark F in order to engage the first coupling member 51 and second coupling member 42 with each other, with the abovementioned first and second axial lines kept coincident with the same virtual line. That is, FIG. 11(b) shows the first coupling member 51 and second coupling member 42 after the second coupling member 42 was moved in the direction indicated by the arrow mark F until the second ridge 42e comes into contact with the first ridge 52e. FIG. 8(b) is a side view of the combination of the first coupling member 51 and second coupling member 42, as seen from the direction perpendicular to their axial lines, when the two coupling members 51 and 42 are in the above described state. The two coupling members 51 and 42 are structured so that when they are in the state shown in FIG. 8(b), the first ridge 51e and second ridge 42e are not parallel to each other; they are definitely intersectional to each other.

Figure 12:
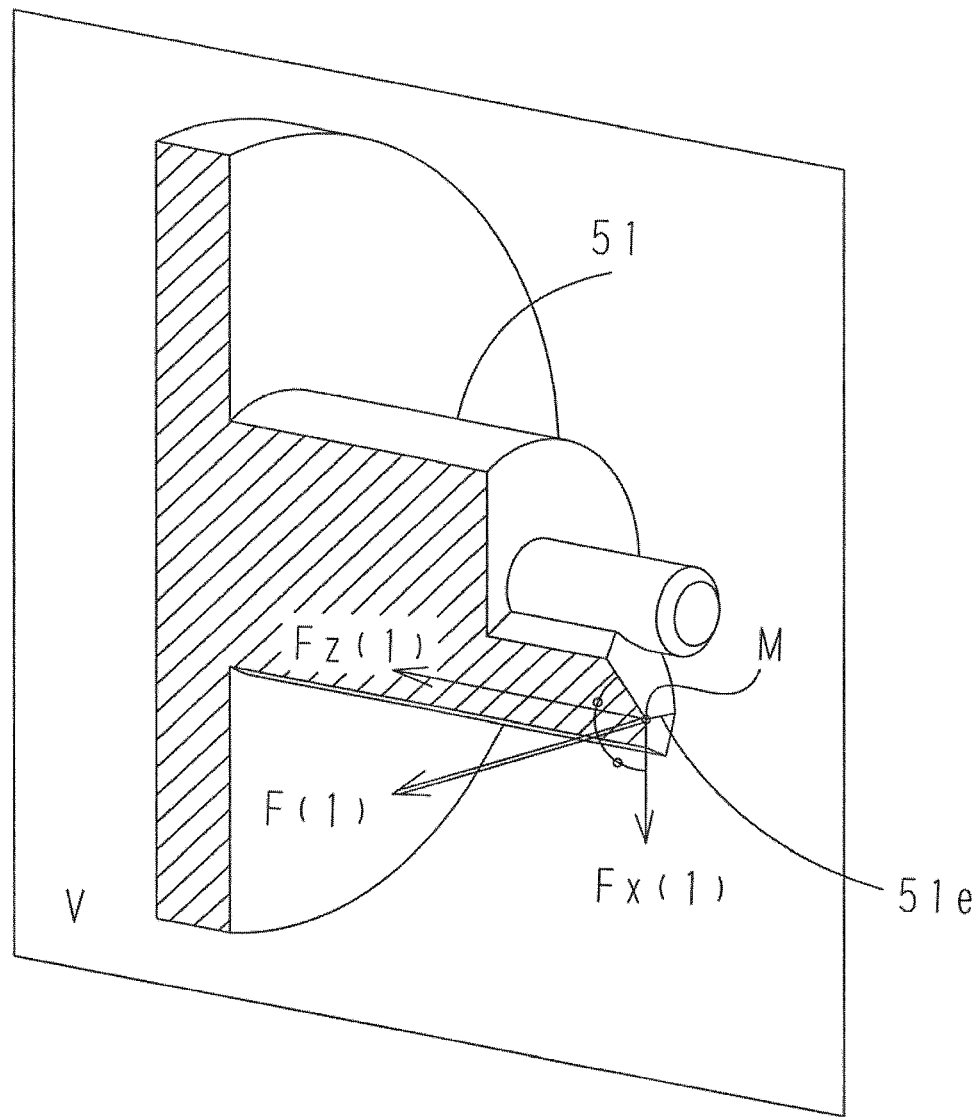
FIG. 12 is a partially sectional perspective view of the driving force transmitting apparatus in the first embodiment.

Next, referring to FIGS. 12 and 13, the relationship between the two forces which act on the point of contact between the first ridge 51e and second ridge 42e as the second coupling member 42, which is in the state shown in FIG. 11(b) is moved in the direction indicated by the arrow mark F, will be described. First, the force which the first ridge 51e of the first coupling member 51 receives from the second ridge 42e of the second coupling member 42 will be described regarding its direction. It is assumed that the first ridge 51e and second ridge 42e contact with each other at a point M of contact. FIG. 12 is a partially perspective sectional view of the first coupling member 51, at a flat plane V, which coincides with the point M of contact, and the normal line of which is parallel to the first ridge 51e. The first coupling member 51 receives a force F(1) represented by an arrow mark F(1), at the point M of contact. The force F(1) is separable into a component Fz(1) which is parallel to the axial line of the first coupling member 51, and a component Fx(1) which is perpendicular to the component Fz(1). FIG. 13(a) is a projection of the force Fx(1) upon the virtual flat plane P. The force Fx(1) is separable into a component Fs(1) which acts in the direction to rotate the first coupling member 51, and a component Fr(1) which is parallel to the radius direction of the first coupling member 51. Since the first coupling member 51 is structured so that as seen from the direction parallel to the axial line of the first coupling member 51, the normal line to the first ridge 51e does not become parallel to the axial line of the first coupling member 51, there is always present the rotational component Fs(1) on the virtual flat plane P.

Figure 14:
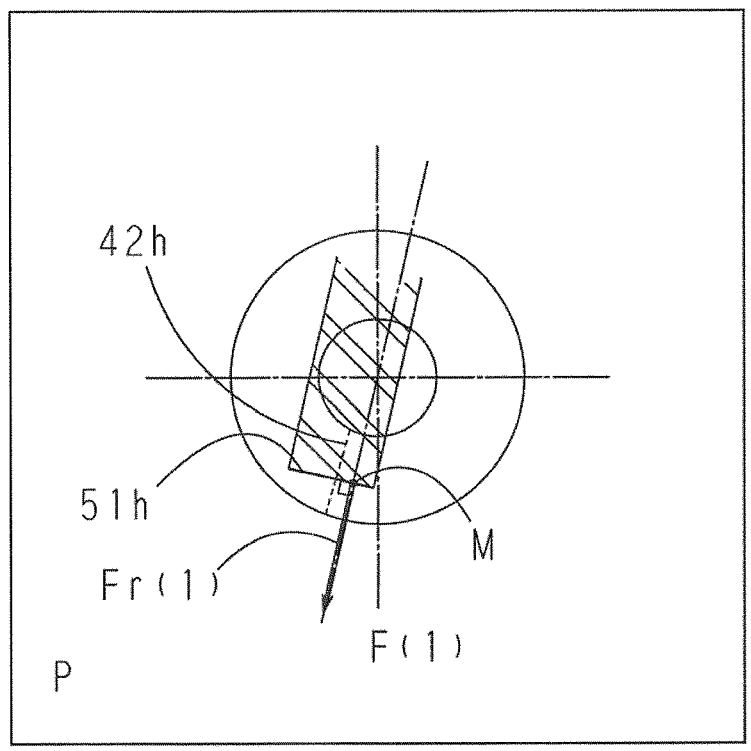
FIG. 14 is a plan view of the driving force transmitting apparatus, and shows the position of the ridges of the driving force transmitting apparatus, at which the interference occurs.

Referring to FIG. 14, if the normal line to the first ridge 51e is parallel to the axial line of the first coupling member 51 as seen from the direction parallel to the axial line of the first coupling member 51, the component force Fx(1) is sometimes made up of only the component force Fr(1), which is parallel to the radius direction of the first coupling member 51; there is no rotational component. In other words, the structural arrangement for the driving force transmitting apparatus in this embodiment ensures that there is always present the rotational component Fs(1), which acts in the direction to rotate the first coupling member 51 in the direction indicated by an arrow mark G. On the other hand, the second coupling member 42 is subjected to a force Fx(12) (reactive force), which is opposite in direction to the force Fx(1) at the point M of contact (FIG. 13(b)). The reactive force Fx(12) is separable into a rotational component Fs(12) and a radial component Fr(12). The second coupling member 42 is subjected to the rotational component Fs(12), which acts in the direction indicated by an arrow mark H, which is opposite in direction to the arrow mark G.

Figure 15:
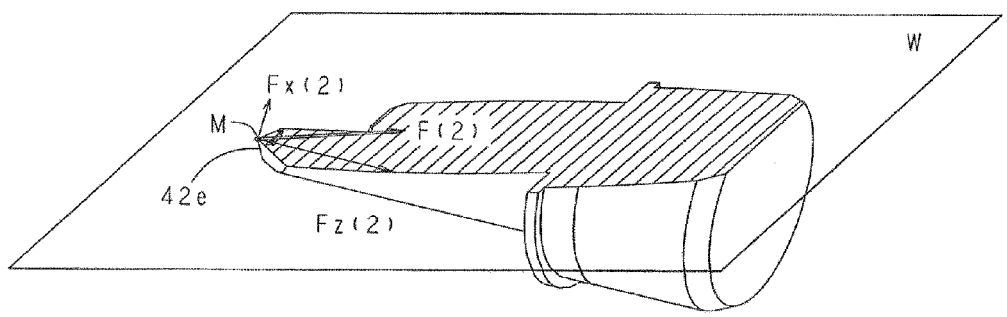
FIG. 15 is a sectional view of the driving force receiving portion of the driving force transmitting apparatus in the first embodiment, at a plane which is angled relative to the axial line of the driving force receiving portion, and also, coincides with the initial point of contact between the driving apparatus transmitting portion and driving force receiving portion.

Next, the force which the second ridge 42e of the second coupling member 42 receives from the first ridge 51e of the first coupling member 51 will be described regarding its direction. It is assumed that the point M is the point of contact between the second ridge 42e and first ridge 51e, as described above. FIG. 15 is a partially perspective sectional view of the second coupling 42 at a flat plane W, at plane which coincides with the point M of contact, and is parallel to the second ridge 42e. The second coupling member 42 is subjected to a force F(2), the amount and direction of which are represented by an arrow mark F(2), at the point M of contact. The force F(2) is separable into a component Fz(2) which is parallel to the axial line of the second coupling member 42, and a component Fx(2) which is perpendicular to the axial line.

Figure 16:
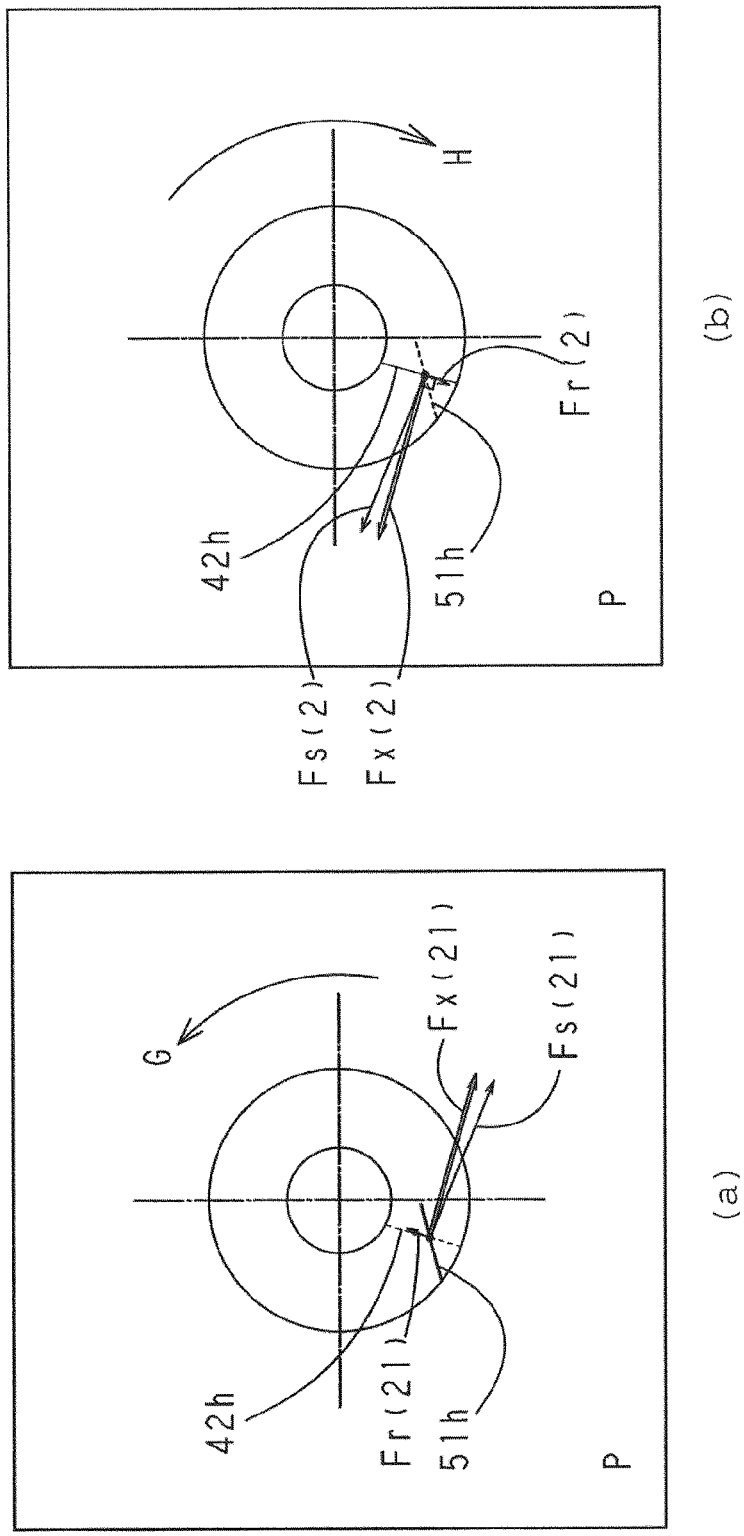
FIGS. 16(a) and 16(b) are plan views of the driving force transmitting apparatus in the first embodiment.

FIG. 16(b) is a projection of the force Fx(2) upon a virtual plate plane P. The force Fx(2) is separable into a rotational component Fs(2) and a radial component Fr(2). It should be noted here that for the ease of description, the arrow marks which show the direction and amount of the above-described forces are made different in size among the drawings. Further, the second coupling member 42 is structured so that as seen from the direction coinciding the axial line of the second coupling member 42, the normal line to the second ridge 42e is not parallel to the axial line. Therefore, there is always the rotational components Fs(2) at the virtual plate plane P, ensuring that the second coupling member 42 rotates in the direction indicated by an arrow mark H. As the driving force is transmitted to the second coupling member 42, the first coupling member 51 is subjected to a reactive force Fx(21), which is opposite in direction to the force Fx(2), at the point M of contact. The reactive force Fx(21) is separable into a rotational component Fs(21) and a radial component Fr(21) as is the abovementioned reactive force Fx(2). Thus, as the first coupling member 51 receives the rotational component Fs(21), it rotates in the direction indicated by the arrow mark G (FIG. 16(a)).

As described above, the first coupling member 51 (first ridge 51e) receives the combination of the rotational components Fs(21) and Fx(21), rotating thereby in the direction indicated by the arrow mark G, whereas the second coupling member 42 (second ridge 42e) receives the combination of the rotational components Fs(2) and Fs(12), rotating thereby in the direction indicated by the arrow mark H. That is, the first ridge 51e and second ridge 42e slide upon each other while receiving force from each other. As a result, the first coupling member 51 and second coupling member 42 rotationally move relative to each other about their axial lines.

It should be noted here that it is unnecessary that in order to ensure that the first coupling member 51 and second coupling member 42 rotate in the directions indicated by the arrow marks G and H, respectively, the first coupling member 51 and second coupling member 42 are structured so that as seen from the direction coinciding with the axial lines (virtual lines), the normal line to the first ridge 51e at the point M of contact between the first ridge 51e and second ridge 42e, and the normal line to the second ridge 42e at the point M of contact, do not coincide with the axial lines. That is, all that is necessary is that the first coupling member 51 and second coupling member 42 are structured so that at least one of the abovementioned normal line to the first ridge 51e and normal line to the second ridge 42e at the point M of contact does not coincide with the axial line as seen from the direction coinciding with the axial lines. However, in a case where the first coupling member 51 and second coupling member 42 are structured so that neither of the abovementioned normal lines does not coincides with the axial lines, it is easier for the first coupling member 51 and second coupling member 42 to move relative to each other, being therefore easier for the first coupling member 51 and second coupling member 42 to engage with each other.

Referring to FIG. 11(b), the first coupling member 51 and second coupling member 42 are subjected to such a force that acts in the direction to rotate the first coupling member 51 in one direction, and the second coupling member 42 in the opposite direction, as described above. Thus, as the second coupling member 42 is further moved in the direction indicated by the arrow mark F (that is, as the cartridge 7 is mounted further into the apparatus main assembly 100A) after the positional relationship between the first coupling member 51 and second coupling member 42 became as shown in FIG. 11(b), the distance between the main portion of the first coupling member 51 and the main portion of the second coupling member 42, in terms of the direction coinciding with the axial lines, becomes smaller, until the positional relationship between the first coupling member 51 and second coupling member 42 becomes as shown in FIG. 11(c), while the first coupling member 51 and second coupling member 42 rotationally move relative to each other. Once the positional relationship between the first coupling member 51 and second coupling member 42 becomes as shown in FIG. 11(c), the first coupling member 51 and second coupling member 42 do not rotationally move relative to each other, and therefore, the second coupling member 42 simply moves in the direction indicated by the arrow mark F. That is, the first coupling member 51 rotates in the direction indicated by the arrow mark G, eliminating thereby the interference between the first coupling member 51 and second coupling member 42 in terms of the direction parallel to the axial lines. The apparatus main assembly 100A is provided with an electromagnetic clutch or the like (unshown), which is a means for preventing the driving force from being transmitted from the apparatus main assembly 100A to the first coupling member 51. That is, the apparatus main assembly 100A is structured so that when the cartridge 7 is mounted into the apparatus main assembly 100A (as first coupling member 51 is pushed by second coupling member 42), the first coupling member 51 is easily rotatable by the second coupling member 42; while the clutch remains disconnected, the amount of force (load) necessary to rotate the first coupling member 51 is very light. Incidentally, instead of providing the apparatus main assembly 100A with the abovementioned means for preventing the driving force from being transmitted, the cartridge 7 may be structured so that the drum flange 42 is allowed to freely rotate by a preset angle relative to the drum cylinder 41. FIG. 11(d) is a perspective view of the combination of the first coupling 52 and second coupling 42 after the second coupling 42 has just moved toward the first coupling member 51 in the axial direction far enough for the driving force transmitting surface 42f to fully engage with the driving force transmitting surface 52f of the first coupling member 51. That is, FIG. 11(d) shows the first coupling member 51 and second coupling member 42 which are fully engaged with each other. Thereafter, the first coupling member 51 is driven by the apparatus main assembly 100A, and rotates in the direction indicated by an arrow mark Q in FIG. 11(d). Thus, the driving force from the apparatus main assembly 100A is transmitted from the first coupling member 51 to the second coupling member 42 as described before. In the description given above regarding the transmission of the driving force from the apparatus main assembly 100A to second coupling member 42, the interference from the first coupling member 51 upon the movement of the second coupling member 42 toward the first coupling member 51 in terms of the axial direction is virtually eliminated by allowing the first coupling member 51 to freely rotate, instead of allowing the second coupling member 42 to freely rotate. However, the apparatus main assembly 100A and cartridge 7 may be structured so that both the first coupling member 52 and second coupling member 42 are allowed to freely rotate to prevent the interference.

As described above, this structural arrangement for a driving force transmitting apparatus makes it unnecessary to retract one of the two driving force transmitting coupling members 52 and 42 of the driving force transmitting apparatus in their axial direction to prevent them from interfering with each other. Thus, this structural arrange makes it possible to provide a coupling (driving force transmitting apparatus) which does not require the space for the prevention of the above described interference, additional components, such as a spring, for keeping the coupling components engaged, etc.

In this embodiment, the first portion of the first coupling member 51 that comes into contact with the second coupling member 42 is the (first) ridge 51e of the first coupling member 51, which is where the flat surface 51c meets the flat surface 51d. However, the first coupling member 51 may be structured so that its portion that comes into contact with the second coupling member 42 first is the ridge 51p (first ridge 51p) which is where the surface 51d meets the surface 51q as shown in FIGS. 1(a) and 6.

Further, the first ridge 51e may be a part of the driving force transmitting surface 51f, and the second ridge 42e may be a part of the driving force transmitting surface 42f.

Further, in this embodiment, the two surfaces which meet with each other at the first ridge are flat. However, the first ridge may be formed by a combination of a flat surface and a curved surface, or a combination of two curved surface, and so is the second ridge.

Further, in this embodiment, the first ridge is straight as described above, and as depicted in the appended drawings. However, the first ridge may be curved, and so is the second ridge.

Further, in this embodiment described above, the first coupling member 51 is a part of the apparatus main assembly 100A, and the second coupling member 42 is a part of the process cartridge 7, being attached to the lengthwise end of the photosensitive drum 1. However, where the second coupling member is attached does not need to be limited to the lengthwise end of the photosensitive drum of a process cartridge. That is, it may be one of the lengthwise ends of the development roller of a developing apparatus, or one of the axial ends of one of the gears of a gear train for transmitting driving force to the development roller of the developing apparatus.

Referring to FIG. 1, the first ridge 51e of the first coupling member 51 is where the surfaces 51d, that is, the first area of contact, and the surface 51c. Further, the surface 51d is perpendicular to the axial line of the coupling member 51. Further, the second coupling member 42 has a surface 42m, which is perpendicular to the axial line of the second coupling member 42.

Therefore, even if the surface 51d, which is perpendicular to the axial line of the first coupling member 51, is at the leading end of the first coupling member 51 when the second coupling 42 is engaged with the first coupling member 51 as shown in FIG. 1, the first surface 51d does not come into contact with any of the surfaces of the second coupling member 42 other than the surface 42m, enabling the two components to engage with each other without interfering with each other in terms of their axial direction.

FIG. 5 is a sectional view of the first coupling member 51 and second coupling member 42, which have just engaged with each other (when driving force receiving surface 42f coincided with driving force transmitting surface 51f in terms of axial direction of two coupling members). FIG. 5 corresponds to FIG. 10(c), which is a perspective view of the first coupling member 51 and second coupling member 42, which have just engaged with each other. The contact between the surface 51d, which is the first portion of contact (first touching portion) of the first coupling member 51, and the surface 42m, which is the second portion of contact (second touching portion) of the second coupling member 42, precisely positions the first coupling member 51 and second coupling member 42 in terms of the direction of their axial lines. It is desired that the driving force transmitting apparatus is structured so that as the driving force is transmitted from the first coupling member 51 to the second coupling member 42, the two coupling members rotate together with the presence of no play between the two. In order to ensure that the two coupling members 51 and 42 rotate together, it is desired that the two coupling members are structured so that while the driving force is transmitted from the first coupling member 51 to the second coupling member 42, there is no play between the two coupling members not only in terms of their rotational direction, but also, in terms of their axial directions.

In the case of the coupler (driving force transmitting apparatus) structure in this embodiment, the first ridge 51e, which is the first portion of the first coupling member 51 that comes into contact with the second coupling member 42, is a part of the surface 51d. Therefore, the surface 51d comes into contact with the surface 42m at the end of the sequence in which the second ridge 42e comes into contact with the first ridge 51e, and the second coupling member 42 engages with the first coupling member 51 with the presence of virtually no interference. Therefore, the contact between the surface 42m and surface 51d ensures that the two coupling members 42 and 51 are precisely positioned relative to each other in terms of their axial direction.

It is not mandatory that the surfaces 51d and 42m are perpendicular to the axial line of the first coupling member 51 and the axial line of the second coupling member 42, respectively. However, from the standpoint of ensuring that the second coupling member 42 comes into the first coupling member 51, and are precisely positioned relative to each other, in terms of their axial directions, both the surfaces 42m and 51d are desired to be perpendicular to the axial directions of the two coupling members.

Further, in this embodiment, the first portion of contact is one of the surfaces of the first coupling member 51, and the second portion of contact is one of the surfaces of the second coupling member 42, as described above. However, all that is necessary is that the contact between the first and second points of contact precisely positions the first and second coupling portions 51 and 42 relative to each other in terms of the axial directions of the two coupling portions. Thus, the first portion of contact may be one of the surfaces of the first coupling member 51, whereas the second portion of contact is a point of the second coupling member 42, or vice versa. Further, the first portion of contact may be one of the surfaces of the first coupling member 51, whereas the second portion of contact is one of the ridges of the second coupling member 42, or vice versa. Further, the first portion of contact may be one of the ridges of the first coupling member 51, whereas the second portion of contact is one of the ridges of the second coupling member 42, or vice versa.

Figure 17:
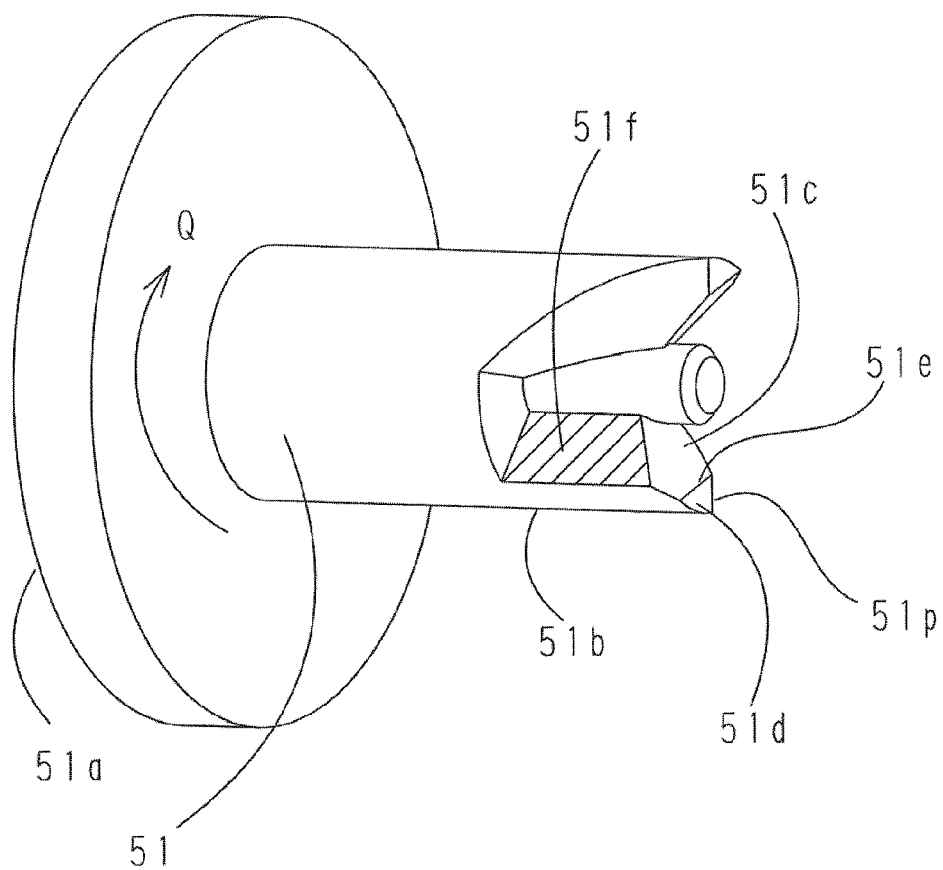
FIG. 17 is a perspective view of the driving force transmitting portion of the driving force transmitting apparatus in the first embodiment.

Further, in this embodiment, the first coupling member 51 is provided with only one driving force transmitting surface, that is, the driving force transmitting surface 51f, and the second coupling member 42 is provided with only one driving force receiving surface, that is, the driving force receiving surface 42f, as described above. However, the first coupling member 51 and second coupling member 42 may be provided two or more driving force transmitting surfaces (52f) and driving force receiving surfaces (42f), which are radially distributed in a manner to surround the axial line of the first coupling member 51 and the axial line of the second coupling member 42, respectively. FIG. 17 shows an example of the first coupling member 51, which has two driving force transmitting surfaces 51f.

Figure 18:
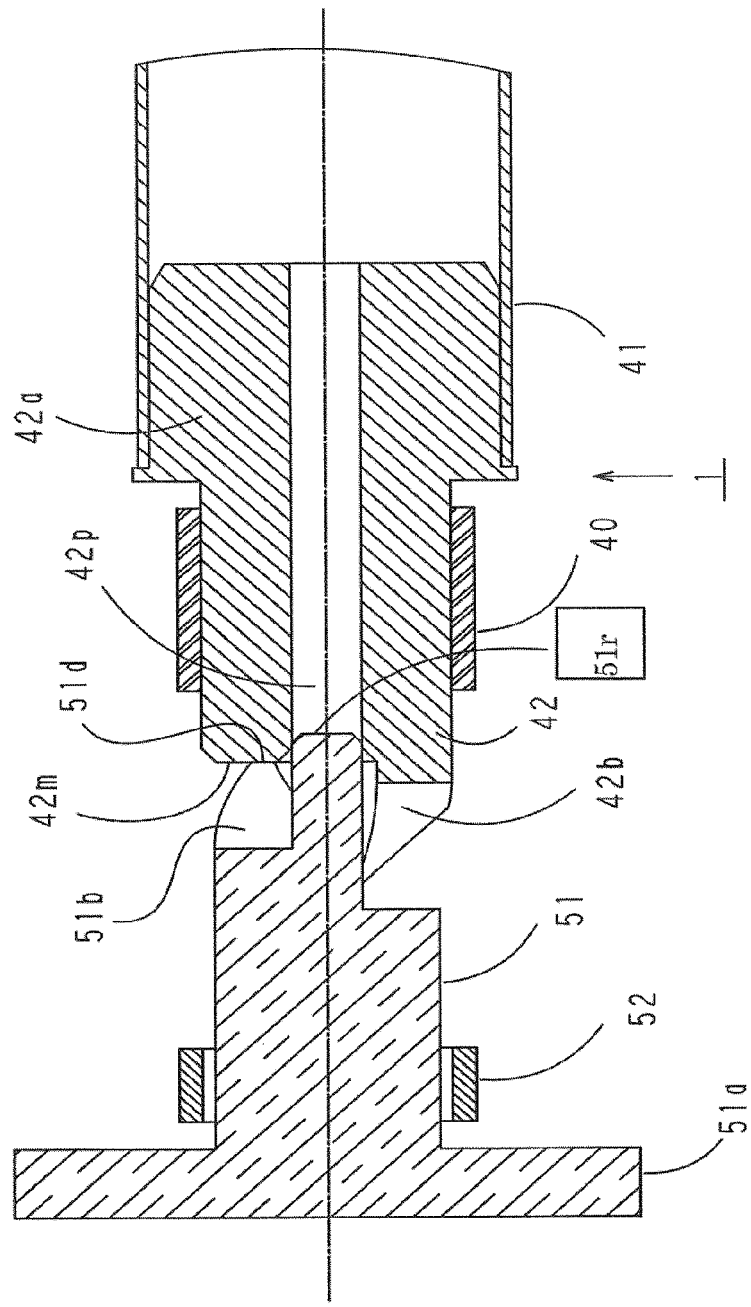
FIG. 18 is a sectional view of the driving force transmitting apparatus in the first embodiment.

As for the alignment between the axial line of the first coupling member 51 and that of the second coupling member 42, it is achieved with the use of the main assembly bearings 52, which is the bearing for the first coupling member 51, and the drum bearing 40, which is the bearing for the second coupling member 42. However, the first coupling member 51 and second coupling member 42 may be aligned by providing the first shaft (rotational axle) of the first coupling member 51 with a boss 51r as the first aligning portion, and providing the second shaft (rotational axle) of the second coupling member 42 with a hole 42p as the second aligning portion. In this case, the engagement of the boss 51r into the hole 42p precisely aligns the axial line of the first coupling member 51 and the axial line of the second coupling member 42 relative to each other (FIG. 18).

Embodiment 2

Next, referring the appended drawings, the second preferred embodiment of the present invention will be described regarding the structure of the driving force transmitting apparatus. In this embodiment, the driving force transmitting apparatus, is in the form of a coupling, the driving force receiving portion of which is attached to the development unit (developing apparatus). Thus, the cartridge and its development unit will be described. More specifically, the combination of first coupling member and second coupling member, which transmits driving force to the stirring member for conveying the developer in the developing apparatus while stirring it will be described.

The development unit frame 31 (shell) of the cartridge shown in FIG. 3 contains a development roller 25, a toner supply roller 34, a stirring member 53, and a development blade 35. The stirring member 53 is for supplying the development roller 25 and toner supply roller 34 with developer while stirring the developer in the adjacencies of the development blade 35. The stirring member 53 is rotatably supported at its lengthwise ends by the development unit frame 31. The development unit is structured so that the stirring roller 53 supplies the development roller 25 and toner supply roller 35 by being rotated in the direction indicated by an arrow mark E by the rotational driving force which it receives through one of its lengthwise ends.

Figure 19:
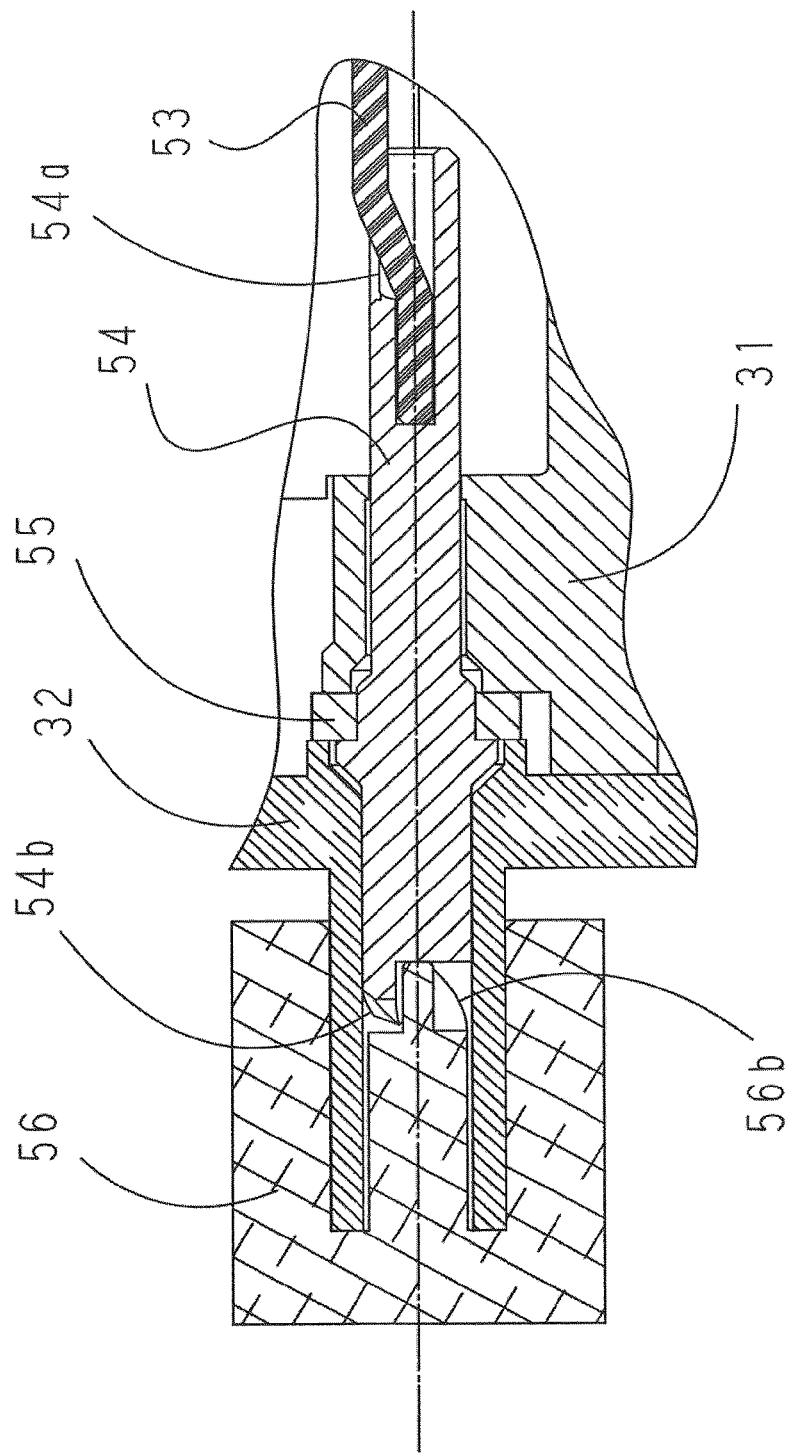
FIG. 19 is a sectional view of the driving force transmitting apparatus in the second preferred embodiment of the present invention.

First, the structural arrangement for transmitting driving force to the stirring member 53 in the development unit frame 31 will be described in detail. FIG. 19 is a sectional view of one of the lengthwise end portion of the cartridge, more specifically, the end portion through which the driving force is transmitted to the stirring member 53, at a plane which coincides with the rotational axis of the stirring member 53 in FIG. 3. One of the lengthwise end portions of the stirring member 53 is rotatably supported by the development unit frame 31 (unshown), whereas the other lengthwise end portion is rotatably supported by a bearing 32. In order to prevent the developer in the development unit frame 31 from leaking out, a sealing member 55 is provided, which is between the development unit frame 31 and bearing 32. The sealing member 55 is also in contact with the peripheral surface of the shaft 54 of the stirring member 53 to prevent the toner (developer) entering between the stirring member shaft 54 and bearing 32. The sealing member 55 is an elastic member formed of foamed urethane or the like. From the standpoint of improving the sealing member 55 in terms of its sealing performance, it is desired to larger by a certain amount in terms of its radius direction (of stirring member shaft 54), as well as axial direction (of bearing member 32) than the space into which it is to be pressed, so that it has to be pressed into the space.

Referring to FIG. 19, the stirring member 53 is in the shape of a crank. It is fitted in a groove 54a, with which the stirring member shaft 54 is provided. Thus, as the stirring member shaft 54, which functions as the second coupling member, is rotationally driven, the stirring member 53 always rotates with the member shaft 54.

Designated by a referential symbol 56 is a gear, which also functions as the first coupling member. The other lengthwise end portion 54b of the stirring member shaft 54 is in engagement with the lengthwise end 56b of the gear 56. The gear 56 is rotatably supported by the bearing 32 in such a manner that its axial line coincides with the axial line of the stirring member shaft 54. The stirring member shaft 54 and gear 56 are structured so that one of the end portions of the stirring member shaft 54 in terms of the axial direction of the stirring member shaft 54 couples with one of the end portions of the gear 56 in terms of the axial direction of the gear 56, as do the first coupling member 51 and second coupling member 42 in the first preferred embodiment with each other. More specifically, referring to FIG. 20, the gear 56, which functions as the first coupling member, has a driving force transmitting surface 56b, and a first ridge 56f which is where the surfaces 56c and 56d of the gear 56 meet with each other. On the other hand, the stirring member shaft 54, which functions as the second coupling member, has a driving force transmitting surface 54f, and a second ridge 54e which is formed by the surfaces 54c and 54d of the stirring member shaft 54. Further, the positional relationship between the first ridge 56e and second ridge 54e is the same as that of the first ridge 51e and second ridge 43e in the above described first preferred embodiment.

Figure 21:
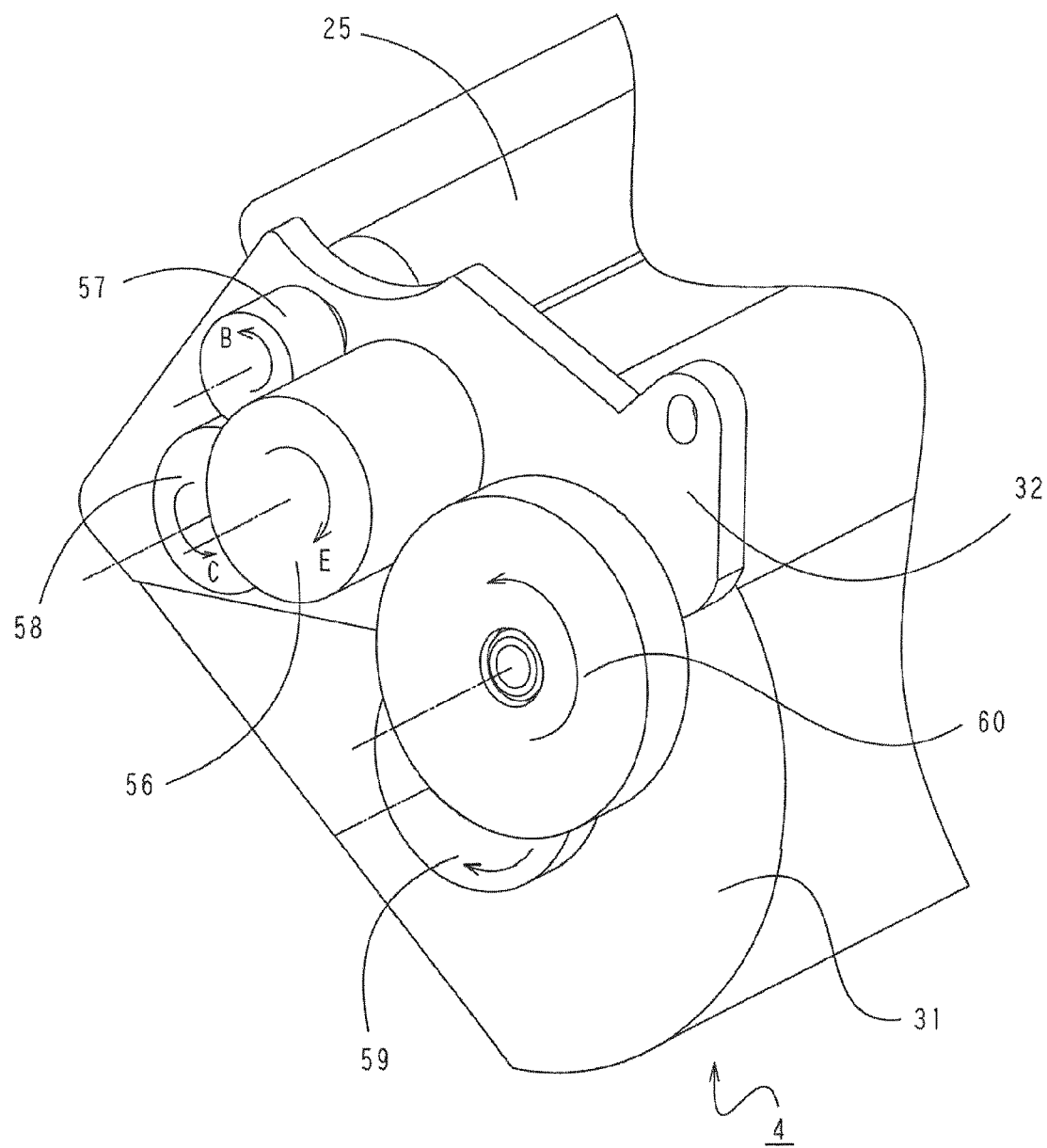
FIG. 21 is a perspective view of the driving force receiving end portion of the developing apparatus in the second embodiment.

FIG. 21 is a perspective view of a part of the development unit 4. The gear 56 has: a portion which meshes with the gear portion 57 of the development roller; a portion which meshes with the gear portion 58 of the toner supply roller; and a portion which meshes with a toner conveyance idler gear 60.

The development roller gear 57 is attached to one of the lengthwise ends of the development roller 25, and the toner supply roller gear 58 is attached to one of the lengthwise ends of the toner supply roller 34 (unshown). The toner conveyance idler gear 60 is for transmitting the rotational driving force to a toner conveyance gear 59 of the toner conveying member 36 (unshown), the axial line of which coincides with that of the toner conveying member 36. Described above are the members of the development unit gear train.

The development unit driving gear train receives driving force from an unshown driving force source of the main assembly of the image forming apparatus. As it receives the driving force, its gears rotate in the directions indicated by arrow marks (B, C, E, etc.). Incidentally, the development unit 4 is provided with a gear train protecting member (unshown), which is attached to the development unit 4 from the direction parallel to the lengthwise direction of the cartridge at the end of the process of assembling development unit, in order to protect the gear train by preventing the gear train from being exposed.

Figure 22:
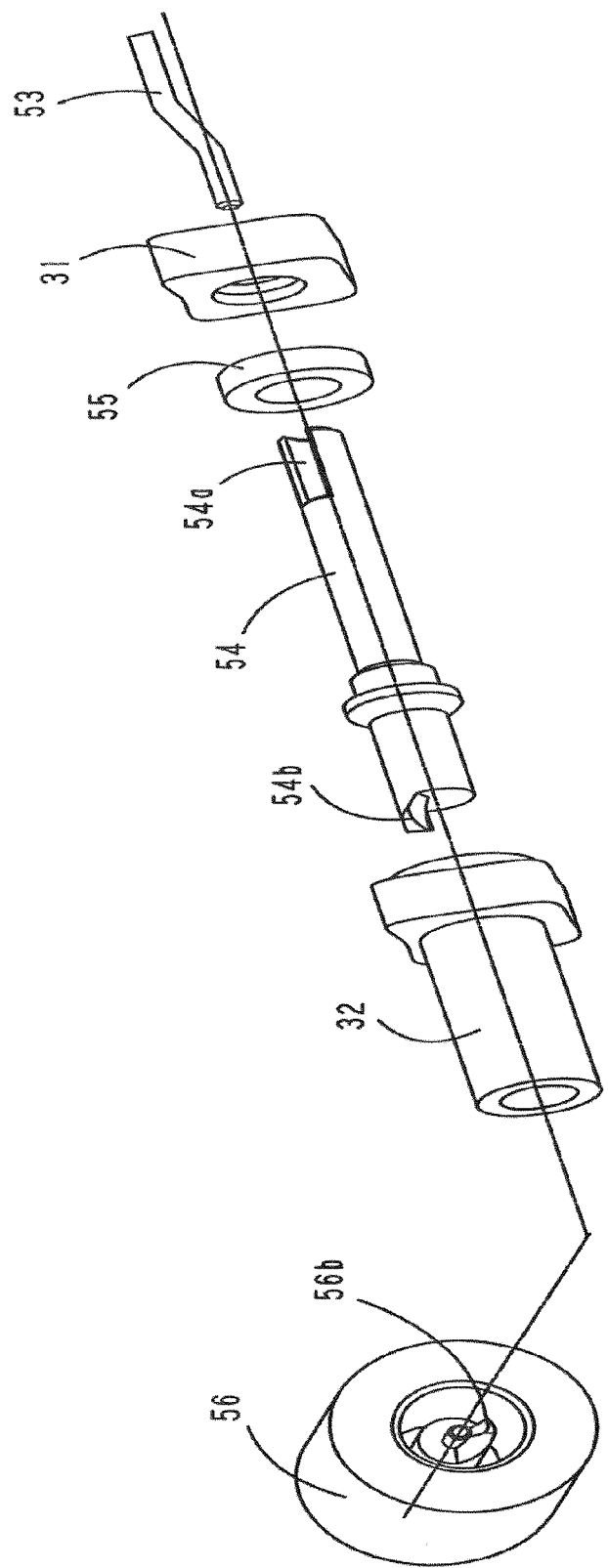
FIG. 22 is a perspective view of the combination of the driving force transmitting portion of the driving force transmitting apparatus in the second embodiment, and the exploded driving force receiving portion of the driving force transmitting apparatus.

When assembling the development unit 4, first, the development unit frame 31 is filled with a preset amount of developer, and then, the stirring member shaft 51 and bearing 32 are attached to the development unit frame 31. Then, the gear 56 is attached to the development unit frame 31 (FIG. 22). If the driving force transmitting apparatus is structured so that the lengthwise end portion of the stirring member shaft 54, which functions as the second coupling member, and the lengthwise end portion of the gear 56, which functions as the first coupling member, interfere with each other when the stirring member shaft 54 supported by the bearing 32 is moved in the direction to be engaged with the gear 56, the gear 56 is pushed in the direction to be moved away from the development unit 4, preventing thereby the stirring member shaft 54 from being placed in the preset position in terms of its axial direction. Further, the driving force cannot be transmitted to the stirring member shaft 54; the stirring member 53 cannot be rotationally driven.

In order to ensure that the driving force is reliably transmitted from the gear 56 to the stirring member shaft 54, it is necessary that the gear 56 and stirring gear shaft 54 are engaged with each other with the presence of no interference between the two. In particular, since the gear 56 meshes with the development roller gear 57, toner supply roller gear 58, etc., it has to be attached so that its teeth smoothly mesh with the teeth of these gears. Therefore, it has to be attached so that it becomes synchronous with these gears in terms of rotational phase. In this embodiment, therefore, the apparatus main assembly 100A and the development unit 4 of the process cartridge 7 are structured so that when the process cartridge 7 is mounted into the apparatus main assembly 100A, at least the stirring member shaft 54 and gear 56 are allowed to rotate in the opposing directions relative to each other. Thus, as the cartridge 7 is mounted into the apparatus main assembly 100A, the stirring member shaft 54 and gear 56 do not interfere with the mounting of the cartridge 7 in terms of the direction parallel to the axial lines of the shaft 54 and gear 56, making it easier for the cartridge 7 to be mounted into the apparatus main assembly 100A.

In the second preferred embodiment described above, the driving force transmitting apparatus is for transmitting driving force to the stirring member. However, it may be a driving force transmitting apparatus for transmitting driving force to the toner conveying member 36. Further, it may be a driving force transmitting apparatus for transmitting driving force to any of the rotational members (inclusive of stirring member) of the process cartridge 7.

Also in this embodiment, the driving force transmitting apparatus is used to drive one of the rotational members in the development unit frame 31. However, it may be used to drive any of the rotational members in the cleaning means frame 27. That is, this embodiment is compatible with any unit (development unit, latent image formation unit, etc.).

INDUSTRIAL APPLICABILITY

According to the present invention, which is related to an electrophotographic image forming apparatus, a cartridge for an electrophotographic image forming apparatus, and a coupling means for coupling the main assembly of an electrophotographic image forming apparatus with a process cartridge to transmit driving force from the main assembly to the process cartridge, it is possible to provide a combination of an electrophotographic image forming apparatus and a cartridge, which does not require a space into which the coupling portion of the apparatus main assembly, or the coupling portion of the cartridge, is allowed to retract, and a spring or the like, which is not essential to the engagement of the coupling means, and also, to provide a method for assembly such a cartridge.

While the invention has been described with reference to the structures disclosed herein, it is not confined to the details set forth, and this application is intended to cover such modifications or changes as may come within the purposes of the improvements or the scope of the following claims.

The invention claimed is:

1. A cartridge detachably mountable to a main assembly of an electrophotographic image forming apparatus, said cartridge comprising:
a cartridge frame for accommodating a developer;
a first coupling member that is rotatable about a first axis, said first coupling member including a first coupling portion that has a first edge line provided at a free end portion of said first coupling member with respect to a direction of the first axis, said first coupling member including a gear portion;

a second coupling member that is rotatable about a second axis, said second coupling member including a second coupling portion that has a second edge line provided at a free end portion of said second coupling member with respect to a direction of the second axis, said second coupling portion of said second coupling member being engageable with said first coupling portion of said first coupling member to receive a driving force from said first coupling member; and a stirring member for stirring the developer in said cartridge frame, said stirring member being operatively engaged with said second coupling member; and a gear member that is engaged with said gear portion of said first coupling member;

an image bearing member;

a developing roller for developing an electrostatic latent image forming on said image bearing member with the developer stirred by said stirring member, said developing roller being operatively engaged with said gear member, wherein when the first edge line and the second edge line are contacted to each other before said first coupling member and said second coupling member are engaged with each other while bringing said gear portion into engagement with said gear member, upon bringing said second coupling member close to said first coupling member in a state in which the first axis and the second axis are substantially aligned with a common phantom line:

(i) the first edge line and the second edge line projected on a first phantom plane including the phantom line are crossed with each other, and (ii) the first edge line and the second edge line projected on a second phantom plane perpendicular to the phantom line are crossed with each other, wherein at least one of a normal line of the first edge line and a normal line of the second edge line at a crossing point does not pass through the phantom line.

2. A cartridge according to claim 1, further including a developer supplying roller for supplying the developer to said developing roller, wherein said developer supplying roller is operatively engaged to said gear member.

3. A cartridge according to claim 1 or 2, wherein there are provided a plurality of gear members, and said second coupling member is brought into engagement with said first coupling member while bringing said gear portion into engagement with said gear members.

4. A cartridge according to claim 1 or 2, wherein when the first edge line and the second edge line are contacted to each other, upon bringing said second coupling member close to said first coupling member in a state in which the first axis and the second axis are substantially aligned with a common phantom line, the second edge line receives a force to rotate said second coupling member.

5. A manufacturing method for manufacturing a cartridge, the cartridge including:

a cartridge frame for accommodating a developer;

a first coupling member that is rotatable about a first axis, the first coupling member including a first coupling portion that has a first edge line provided at a free end portion of the first coupling member with respect to a direction of the first axis, the first coupling member including a gear portion;

a second coupling member that is rotatable about a second axis, the second coupling member including a second coupling portion that has a second edge line provided at a free end portion of the second coupling member with respect to a direction of the second axis, the second coupling portion of said second coupling member being engageable with the first coupling portion of the first coupling member to receive a driving force from the first coupling member; and a stirring member for stirring the developer in the cartridge frame, the stirring member being operatively engaged with said second coupling member; and a gear member engageable with the gear portion of the first coupling member;

an image bearing member;

a developing roller for developing an electrostatic latent image forming on said image bearing member with the developer stirred by the stirring member, the developing roller being operatively engaged with the gear member, wherein when the first edge line and the second edge line are contacted to each other before the first coupling member and the second coupling member are engaged with each other while bringing the gear portion into engagement with the gear member, upon bringing the second coupling member close to the first coupling member in a state in which the first axis and the second axis are substantially aligned with a common phantom line:

(i) the first edge line and the second edge line projected on a first phantom plane including the phantom line are crossed with each other, and (ii) the first edge line and the second edge line projected on a second phantom plane perpendicular to the phantom line are crossed with each other, wherein at least one of a normal line of the first edge line and a normal line of the second edge line at a crossing point does not pass through the phantom line, said method comprising:

a step of assembling the gear member and the second coupling member into the cartridge frame; and a rotating step of rotating the second coupling member and the stirring member with respect to the first coupling member in a state that the first edge line is in contact with the second edge line so that the first coupling portion of the first coupling member engages with the second coupling portion of the second coupling member, while engaging the gear portion of the first coupling member and the gear member with each other.

6. A cartridge detachably mountable to a main assembly of an electrophotographic image forming apparatus, said cartridge comprising:

a cartridge frame for accommodating a developer;

a first coupling member that is rotatable about a first axis, said first coupling member including a first coupling portion that has a first edge line provided at a free end portion of said first coupling member with respect to a direction of the first axis, said first coupling member including a gear portion;

a second coupling member that is rotatable about a second axis, said second coupling member including a second coupling portion that has a second edge line provided at a free end portion of said second coupling member with respect to a direction of the second axis, said second coupling portion of said second coupling member being engageable with said first coupling portion of said first coupling member to receive a driving force from said first coupling member; and a stirring member for stirring the developer in said cartridge frame, said stirring member being operatively engaged with said second coupling member; and a gear member that is engaged with said gear portion of said first coupling member;

an image bearing member;

a developing roller for developing an electrostatic latent image forming on said image bearing member with the developer stirred by said stirring member, said developing roller being operatively engaged with said gear member, wherein when the first edge line and the second edge line are contacted to each other before said first coupling member and said second coupling member are engaged with each other while bringing said gear portion into engagement with said gear member, upon bringing said second coupling member close to said first coupling member in a state in which the first axis and the second axis are substantially aligned with a common phantom line:

(i) the first edge line and the second edge line projected on a first phantom plane including the phantom line are crossed with each other, and (ii) the first edge line and the second edge line projected on a second phantom plane perpendicular to the phantom line are crossed with each other, and at least one of a normal line of the first edge line and a normal at a second edge line at a crossing point does not pass through the phantom line.

7. A cartridge according to claim 6, further including a developer supplying roller for supplying the developer to said developing roller, wherein said developer supplying roller is operatively engaged to said gear member.

8. A cartridge according to claim 6 or 7, wherein there are provided a plurality of gear members, and said second coupling member is brought into engagement with said first coupling member while bringing said gear portion into engagement with said gear members.

9. A cartridge according to claim 6 or 7, wherein when the first edge line and the second edge line are contacted to each other, upon bringing said second coupling member close to said first coupling member in a state in which the first axis and the second axis are substantially aligned with a common phantom line, the second edge line receives a force to rotate said second coupling member.

10. A manufacturing method for manufacturing a cartridge, the cartridge including:

a cartridge frame for accommodating a developer;

a first coupling member that is rotatable about a first axis, the first coupling member including a first coupling portion that has a first edge line provided at a free end portion of the first coupling member with respect to a direction of the first axis, the first coupling member including a gear portion;

a second coupling member that is rotatable about a second axis, the second coupling member including a second coupling portion that has a second edge line provided at a free end portion of the second coupling member with respect to a direction of the second axis, the second coupling portion of said second coupling member being engageable with the first coupling portion of the first coupling member to receive a driving force from the first coupling member; and a stirring member for stirring the developer in the cartridge frame, the stirring member being operatively engaged with said second coupling member; and a gear member engageable with the gear portion of the first coupling member;

an image bearing member;

a developing roller for developing an electrostatic latent image forming on said image bearing member with the developer stirred by the stirring member, the developing roller being operatively engaged with the gear member, wherein when the first edge line and the second edge line are contacted to each other before the first coupling member and the second coupling member are engaged with each other while bringing the gear portion into engagement with the gear member, upon bringing the second coupling member close to the first coupling member in a state in which the first axis and the second axis are substantially aligned with a common phantom line:

(i) the first edge line and the second edge line projected on a first phantom plane including the phantom line are crossed with each other, and (ii) the first edge line and the second edge line projected on a second phantom plane perpendicular to the phantom line are crossed with each other, and at least one of a normal line of the first edge line and a normal at a second edge line at a crossing point does not pass through the phantom line, said method comprising:

a step of assembling the gear member and the second coupling member into the cartridge frame; and a rotating step of rotating the second coupling member and the stirring member with respect to the first coupling member in a state that the first edge line is in contact with the second edge line so that the first coupling portion of the first coupling member engages with the second coupling portion of the second coupling member, while engaging the gear portion of the first coupling member and the gear member with each other.

* * * * *